US012607897B2

(12) United States Patent
Miyazaki et al.

(10) Patent No.: US 12,607,897 B2
(45) Date of Patent: Apr. 21, 2026

(54) OPTICAL WAVEGUIDE ELEMENT, OPTICAL MODULATOR, OPTICAL MODULATION MODULE, AND OPTICAL TRANSMISSION DEVICE

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 306 days.

(21) Appl. No.: 18/550,472

(22) PCT Filed: Aug. 25, 2022

(86) PCT No.: PCT/JP2022/032102
§ 371 (c)(1),
(2) Date: Sep. 14, 2023

(87) PCT Pub. No.: WO2023/032816
PCT Pub. Date: Mar. 9, 2023

(65) Prior Publication Data
US 2024/0184181 A1     Jun. 6, 2024

(30) Foreign Application Priority Data

Aug. 31, 2021    (JP) ................................. 2021-140648

(51) Int. Cl.
*G02F 1/225*     (2006.01)
*G02F 1/21*      (2006.01)
(52) U.S. Cl.
CPC ............ *G02F 1/2255* (2013.01); *G02F 1/212* (2021.01)

(58) Field of Classification Search
CPC ..................................................... G02F 1/2255
See application file for complete search history.

(56) References Cited

U.S. PATENT DOCUMENTS

| 10,185,165 B2 * | 1/2019 | Hosokawa | .............. G02F 1/225 |
| 10,955,723 B2 * | 3/2021 | Sugiyama | .............. G02F 1/218 |

(Continued)

FOREIGN PATENT DOCUMENTS

| JP | 2007-264548 A | 10/2007 |
| JP | 2016-194574 A | 11/2016 |

(Continued)

OTHER PUBLICATIONS

Internation Search Report, International Application No. PCT/JP2022/032102, Date of mailing Oct. 4, 2022, 2 pages.

*Primary Examiner* — Rhonda S Peace
(74) *Attorney, Agent, or Firm* — Rankin, Hill & Clark LLP

(57) ABSTRACT
An optical waveguide device including: an optical waveguide composed of a protruding portion extending on a substrate; a signal electrode that is formed on the substrate and controls light waves propagating through the optical waveguide, in which the optical waveguide includes a Mach-Zehnder optical waveguide including two parallel waveguides having curved portions, the signal electrode includes two signal lines for transmitting a differential signal, respectively intersecting the two parallel waveguides at the curved portions, and in an intersection region, which is a region on the substrate where the two signal lines and the two parallel waveguides intersect, at least one of the two signal lines has a signal propagation velocity faster than in a portion other than the intersection region or one of the two signal lines has a signal propagation velocity faster than an other signal line.

15 Claims, 19 Drawing Sheets

(56)     References Cited

U.S. PATENT DOCUMENTS

| | | | | |
|---|---|---|---|---|
| 11,003,044 | B2 * | 5/2021 | Hara | G02F 1/2255 |
| 2010/0119189 | A1 * | 5/2010 | Nasu | H04B 10/676 |
| | | | | 385/11 |
| 2018/0039104 | A1 * | 2/2018 | Hosokawa | G02F 1/225 |
| 2019/0271896 | A1 * | 9/2019 | Sugiyama | G02F 1/218 |
| 2020/0272021 | A1 * | 8/2020 | Hara | G02F 1/0356 |
| 2023/0367147 | A1 * | 11/2023 | Miyazaki | G02F 1/01 |
| 2023/0367169 | A1 * | 11/2023 | Okahashi | G02B 6/12 |
| 2024/0152021 | A1 * | 5/2024 | Miyazaki | G02F 1/2255 |
| 2024/0184181 | A1 * | 6/2024 | Miyazaki | G02F 1/225 |
| 2024/0319558 | A1 * | 9/2024 | Miyazaki | G02F 1/2255 |

FOREIGN PATENT DOCUMENTS

| | | | |
|---|---|---|---|
| JP | 2019-152732 | A | 9/2019 |
| JP | 2020-134876 | A | 8/2020 |
| WO | 2018/031916 | A1 | 2/2018 |

* cited by examiner

OPTICAL MODULATOR UNIT A DETAILED

OPTICAL FOLDED PART B DETAILED

IX-IX CROSS SECTION

OPTICAL WAVEGUIDE ELEMENT, OPTICAL MODULATOR, OPTICAL MODULATION MODULE, AND OPTICAL TRANSMISSION DEVICE

TECHNICAL FIELD

The present invention relates to an optical waveguide device, an optical modulator, an optical modulation module, and an optical transmission apparatus.

BACKGROUND ART

In a high-frequency and large-capacity optical fiber communication system, an optical modulator incorporating an optical modulation device as an optical waveguide device including an optical waveguide formed on a substrate and a control electrode for controlling light waves propagating in the optical waveguide is often used. Among these, optical modulation devices in which $LiNbO_3$ (hereinafter, also referred to as LN) having an electro-optic effect is used for substrates has a small optical loss and can realize a broadband optical modulation characteristic, so the optical modulation devices are widely used for high-frequency/large-capacity optical fiber communication systems.

In particular, due to the increasing transmission capacity in recent years, the mainstream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into metro networks.

Further, in recent years, in order to implement further low-voltage driving and high-frequency modulation while miniaturizing the optical modulator itself, optical modulators using a rib-type optical waveguide or ridge optical waveguide (hereinafter collectively referred to as convex optical waveguides) formed by forming strip-shaped protruding portions on the surface of a thinned LN substrate (thin plate) (for example, a thickness of 20 μm or less) to further strengthen the interaction between the signal electric field and the guided light in the substrate are also being put to practical use (for example, Patent Literatures No. 1 and No. 2).

Further, in addition to reducing the size of the optical modulation device, for example, efforts are underway to house an electronic circuit and an optical modulation device in one housing and to integrate them into an optical modulation module. For example, an optical modulation module designed to be miniaturized and integrated has been proposed in which an optical modulation device and a high-frequency driver amplifier driving the optical modulation device are integrated and housed in one housing, and optical input and output portions are disposed in parallel on one surface of the housing. In the optical modulation device used in such an optical modulation module, the optical waveguide is formed on the substrate such that the light propagation direction is folded back such that an optical input end and an optical output end of the optical waveguide are disposed on one side of the substrate configuring the optical modulation device (for example, Patent Literature No. 3). Hereinafter, an optical modulation device including an optical waveguide including such a folded portion in the light propagation direction will be referred to as a folded optical modulation device.

Incidentally, an optical modulator that performs QPSK modulation (QPSK optical modulator) and an optical modulator that performs DP-QPSK modulation (DP-QPSK optical modulator) each include a plurality of Mach-Zehnder optical waveguides having a so-called nested structure called a nested type, which has at least one signal electrode to which a high-frequency signal is applied. These signal electrodes formed on the substrate extend to the vicinity of the outer periphery of the LN substrate for connection with an electric circuit outside the substrate. Therefore, on the substrate, the plurality of optical waveguides and the plurality of signal electrodes intersect in a complicated manner, and a plurality of intersections where the signal electrodes traverse the optical waveguides are formed.

At such intersections, an electric field is applied from the signal electrode crossing over the optical waveguide to the portion of the optical waveguide below the signal electrode, and the phase of the light propagating through the optical waveguide is slightly changed and modulated. The phase change or phase modulation of light at such intersections may act as noise for the optical phase change for normal modulation generated in the optical waveguide by the signal electrode and disturb the optical modulation operation. Hereinafter, phase modulation due to noise generated at such intersections is referred to as disturbance modulation.

The degree of the noise effect of the disturbance modulation on the optical modulation operation in the optical modulator is larger as the electric field applied from the signal electrode to the optical waveguide at the intersection is stronger, and also increases due to addition effects proportional to the number of intersections (for example, depending on the sum of the lengths of intersections (intersection lengths) along the signal electrodes).

For example, while in a configuration in the related art in which an optical waveguide formed by diffusing a metal such as Ti on the flat surface of an LN substrate (so-called planar optical waveguide) intersects with a signal electrode formed on the substrate plane of the LN substrate, the signal electrode is formed only on the upper surface (substrate surface) of the optical waveguide, in a configuration in which the convex optical waveguide and the signal electrode intersect as described above, the signal electrode can also be formed on the upper surface and two side surfaces of the protruding portion of the convex optical waveguide. Therefore, since the electric field applied from the signal electrode to the optical waveguide at the intersection is stronger in the case of the convex optical waveguide than in the case of the planar optical waveguide, and the interaction with light waves that are even more strongly confined becomes stronger, the noise due to the disturbance modulation can occur larger in the convex optical waveguide than in the case of the planar optical waveguide.

Further, in the folded optical modulation device as described above, there are more intersections between the electrode and the optical waveguide than in a non-folded optical modulation device formed of an optical waveguide that does not include a light folded portion (for example, see FIG. 1 of Patent Literature No. 3), so that the noise due to the disturbance modulation can be larger. For example, in the case of the DP-QPSK modulation element described above, while in the non-folded optical modulation device, the number of intersections in one electrode is about 2 to 4, and the total intersection length is several tens of microns (for example, a range from 20 μm to 40 μm), in the folded optical modulation device, the number of intersections in one electrode may reach a several tens, and the total intersection length may be several hundred microns to several millimeters.

Therefore, particularly in the folded optical modulation device configured by using the convex optical waveguide, the noise due to the disturbance modulation generated at the intersections may be so large that it cannot be ignored for the normal optical modulation operation. Further, particularly in the Mach-Zehnder optical waveguide including two parallel waveguides, the disturbance modulation not only generates noise in each optical signal propagating in these parallel waveguides, but also generates noise in the phase difference between these two signal lights. This phase difference noise causes a larger noise due to the optical interference action when these light waves are combined in the Mach-Zehnder optical waveguide, and can have a great influence on the optical modulation operation.

In addition, the above intersections can also be formed in various optical waveguide devices such as optical waveguide devices using a semiconductor such as InP as a substrate and silicon photonics waveguide devices using Si as a substrate, as well as the LN substrates. Moreover, such optical waveguide devices may be various optical waveguide devices such as optical modulators using Mach-Zehnder optical waveguides, optical modulators using optical waveguides forming a directional coupler or a Y branch, or optical switches.

Then, when the optical waveguide pattern and the electrode pattern become complicated due to further miniaturization, multi-channelization, and/or high integration of the optical waveguide device, the number of intersections on the substrate increases more and more, and noise due to disturbance modulation may become a non-negligible factor and limit the performance of the optical waveguide device.

CITATION LIST

Patent Literature

[Patent Literature No. 1] Japanese Laid-open Patent Publication No. 2007-264548
[Patent Literature No. 2] Pamphlet of International Publication No. WO2018/031916
[Patent Literature No. 3] Japanese Laid-open Patent Publication No. 2019-152732

SUMMARY OF INVENTION

Technical Problem

From the above background, in an optical waveguide device having a plurality of intersections between convex optical waveguides and signal electrodes for propagating electrical signals, it is required to effectively reduce the occurrence of disturbance modulation at the intersections to achieve good operating characteristics.

Solution to Problem

One aspect of the present invention is an optical waveguide device including: an optical waveguide composed of a protruding portion extending on a substrate; and a signal electrode that is formed on the substrate and controls light waves propagating through the optical waveguide, in which the optical waveguide includes a Mach-Zehnder optical waveguide including two parallel waveguides having curved portions, the signal electrode includes two signal lines for transmitting a differential signal, each intersecting the two parallel waveguides at the curved portions, and in an intersection region, which is a region on the substrate where the two signal lines and the two parallel waveguides intersect each other, at least one of the two signal lines has a signal propagation velocity faster than in a portion other than the intersection region or one of the two signal lines has a signal propagation velocity faster than an other signal line.

According to another aspect of the present invention, the substrate is provided with an intermediate layer between the substrate and the signal lines, and a thickness of the intermediate layer in the intersection region is larger than a thickness in the portion other than the intersection region.

According to another aspect of the present invention, an intermediate layer is provided between the substrate and the signal lines in the intersection region, and the intermediate layer is not provided in the portion other than the intersection region, on the substrate.

According to another aspect of the present invention, the thickness of the intermediate layer in the intersection region is at least twice as large as the thickness in the portion other than the intersection region.

According to another aspect of the present invention, in the intersection region, one of the two signal lines has a longer intersection clearance, which is a clearance between positions intersecting the two parallel waveguides, than an other signal line, and the intermediate layer in the intersection region has a thickness in a lower portion of the one of the two signal lines larger than a thickness in a lower portion of the other.

According to another aspect of the present invention, the two signal lines have a thickness in the intersection region larger than a thickness in the portion other than the intersection region.

According to another aspect of the present invention, the two signal lines have the thickness in the intersection region that is at least twice as large as the thickness in the portion other than the intersection region.

According to another aspect of the present invention, in the intersection region, one of the two signal lines has a longer intersection clearance, which is a clearance between positions intersecting the two parallel waveguides, than an other signal line, and in the intersection region, a thickness of one of the two signal lines is larger than a thickness of an other signal line of the two signal lines.

According to another aspect of the present invention, the two signal lines have a width in the intersection region narrower than a width in a portion upstream of the intersection region along a propagation direction of the differential signal.

According to another aspect of the present invention, in the intersection region, one of the two signal lines has a longer intersection clearance, which is a clearance between positions intersecting the two parallel waveguides, than an other signal line, and in the intersection region, a width of one of the two signal lines is narrower than a width of an other signal line of the two signal lines.

According to another aspect of the present invention, a ground electrode is provided on the substrate, and a clearance between the two signal electrodes and the ground electrode in the intersection region is wider than a clearance in the portion other than the intersection region.

Another aspect of the present invention is an optical modulator including: the optical waveguide device according to any one of the above aspects, which is an optical modulation device that modulates light; a housing that houses the optical waveguide device; an optical fiber that inputs light to the optical waveguide device; and an optical fiber that guides light output by the optical waveguide device to outside the housing.

Another aspect of the present invention is an optical modulation module including: the optical waveguide device according to any one of the above aspects, which is an optical modulation device that modulates light; and a drive circuit that drives the optical waveguide device.

Another aspect of the present invention is an optical transmission apparatus including the optical modulator or the optical modulation module, and an electronic circuit that generates an electrical signal for causing the optical waveguide device to perform a modulation operation.

This specification includes all the contents of Japanese Patent Application No. 2021-140648 filed on Aug. 31, 2021.

Advantageous Effects of Invention

According to the present invention, in an optical waveguide device having a plurality of intersections between convex optical waveguides and electrodes for propagating electrical signals, the occurrence of disturbance modulation at the intersections is effectively reduced, thereby achieving good operating characteristics.

BRIEF DESCRIPTION OF DRAWINGS

FIG. 1 is a diagram illustrating a configuration of an optical modulator according to a first embodiment of the present invention.

DESCRIPTION OF EMBODIMENTS

Figure 2:
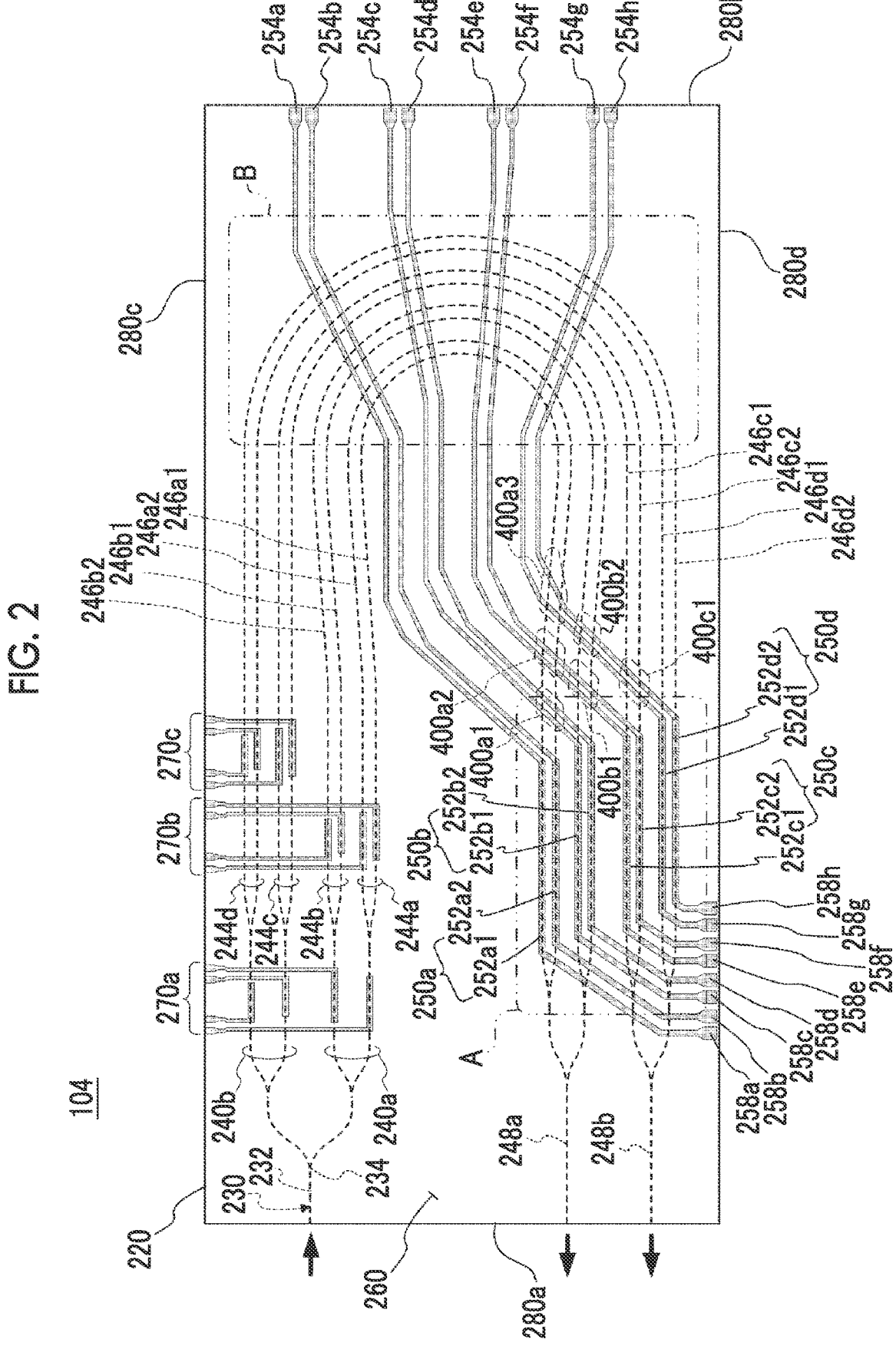
FIG. 2 is a diagram illustrating a configuration of an optical modulation device used in the optical modulator illustrated in FIG. 1.

Hereinafter, embodiments of the present invention will be described with reference to the drawings.

1. First Embodiment

Figure 1:
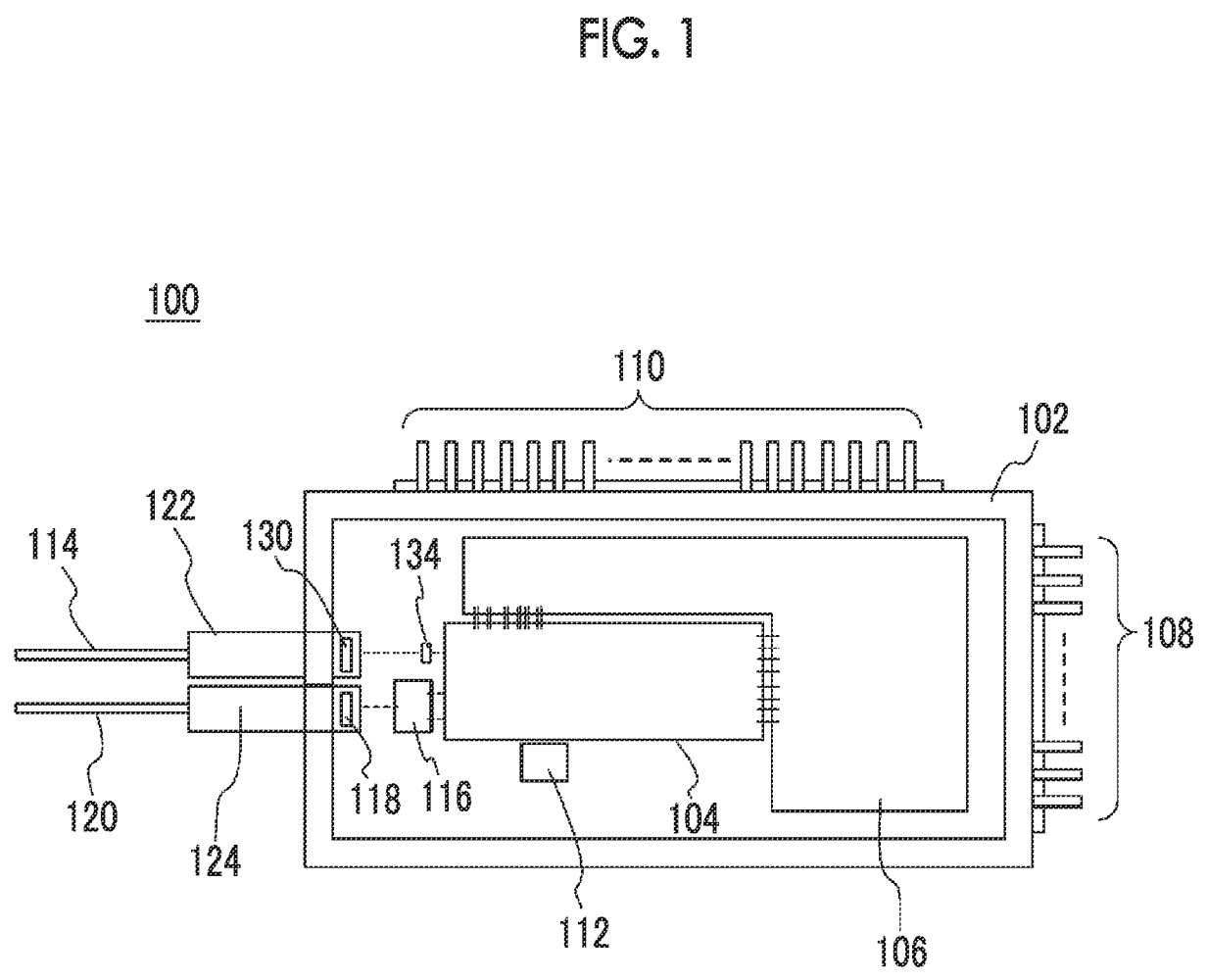

First, a first embodiment will be described. FIG. 1 is a diagram illustrating a configuration of an optical modulator 100 using an optical modulation device, which is an optical waveguide device according to a first embodiment of the present invention. The optical modulator 100 includes a housing 102, an optical modulation device 104 housed in the housing 102, and a relay substrate 106. The optical modulation device 104 is, for example, a configuration of a DP-QPSK modulator. Finally, a cover (not shown), which is a plate body, is fixed to the opening of the housing 102, and the inside of the housing 102 is hermetically sealed.

The optical modulator 100 has signal pins 108 for receiving a high-frequency electrical signal used for modulation of the optical modulation device 104, and signal pins 110 for inputting an electrical signal used for adjusting the operating point of the optical modulation device 104.

Further, the optical modulator 100 includes an input optical fiber 114 for inputting light into the housing 102 and an output optical fiber 120 for guiding the light modulated by the optical modulation device 104 to the outside of the housing 102 on the same surface of the housing 102.

Here, the input optical fiber 114 and the output optical fiber 120 are fixed to the housing 102 via the supports 122 and 124 which are fixing members, respectively. The light input from the input optical fiber 114 is collimated by the lens 130 disposed in the support 122, and then input to the optical modulation device 104 via the lens 134. However, this is only an example, and the input of light to the optical modulation device 104 may be performed by introducing, for example, the input optical fiber 114 into the housing 102 via the support 122, and connecting the end face of the introduced input optical fiber 114 to the end face of the substrate 220 (described later) of the optical modulation device 104, according to the related art.

The optical modulator 100 also has an optical unit 116 that polarizes and synthesizes two beams of modulated light output from the optical modulation device 104. The light after polarization synthesis, output from the optical unit 116, is collected by the lens 118 disposed in the support 124 and coupled to the output optical fiber 120.

The relay substrate 106 relays the high-frequency electrical signal input from the signal pins 108 and the electrical signal for adjusting an operating point input from the signal pins 110 to the optical modulation device 104, according to a conductor pattern (not shown) formed on the relay substrate 106. The conductor pattern on the relay substrate 106 is connected to a pad (described later) configuring one end of the electrode of the optical modulation device 104 by wire bonding or the like, for example. Further, the optical modulator 100 includes a terminator 112 having a predetermined impedance in the housing 102.

Figure 3:
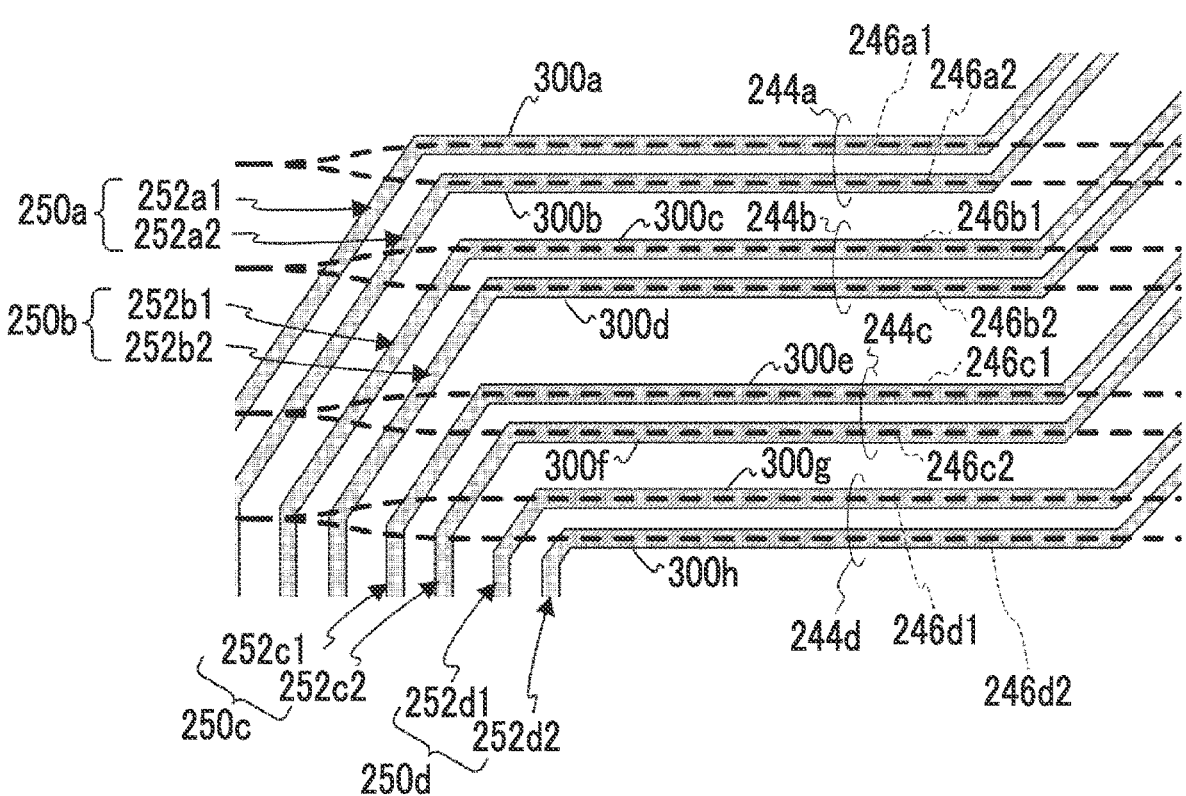
FIG. 3 is a partial detailed view of an optical modulator unit A of the optical modulation device illustrated in FIG. 2.
Figure 4:
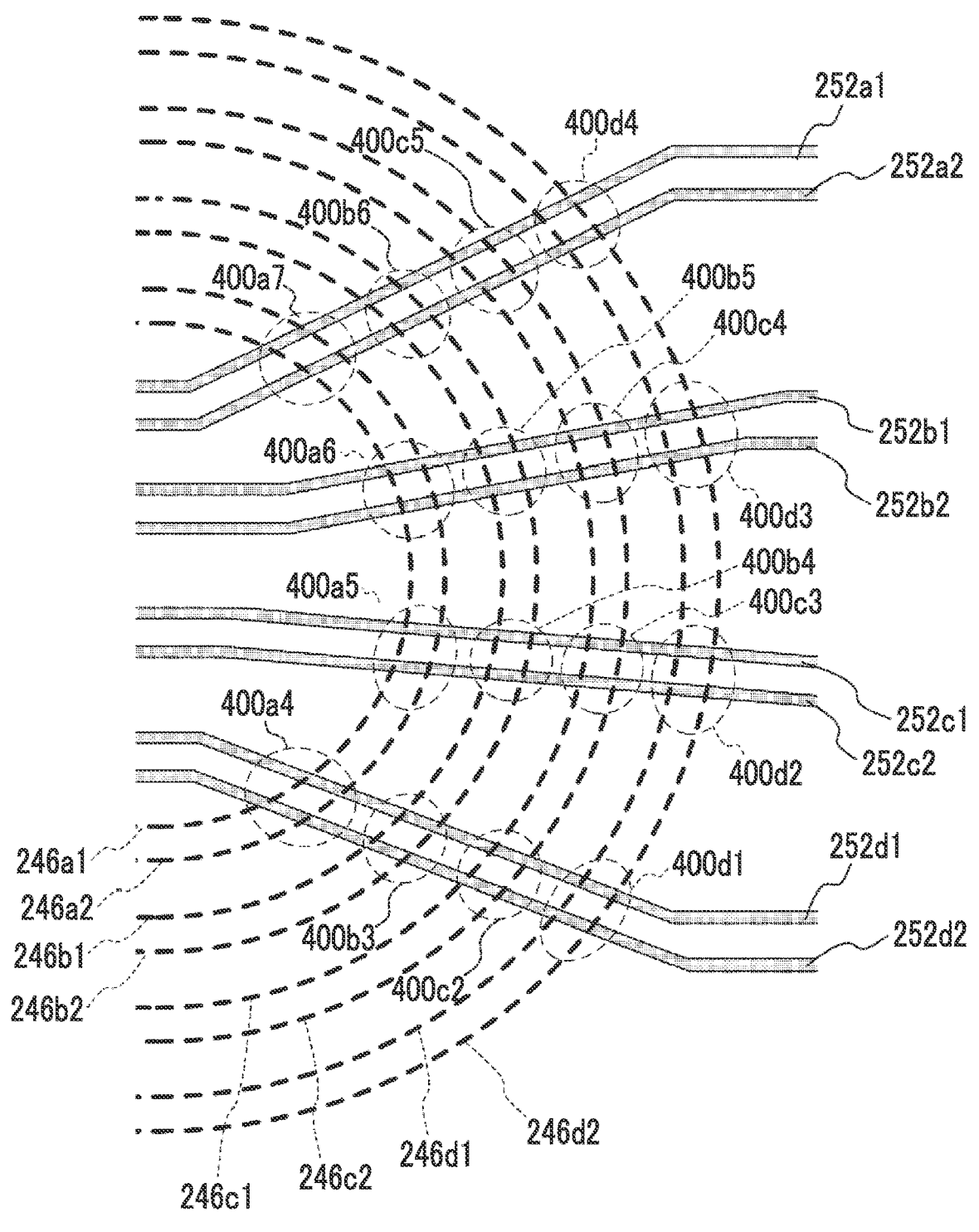
FIG. 4 is a partial detailed view of an optical folded part B of the optical modulation device illustrated in FIG. 2.

FIG. 2 is a diagram illustrating an example of the configuration of the optical modulation device 104, which is housed in the housing 102 of the optical modulator 100 illustrated in FIG. 1. Further, FIGS. 3 and 4 are partial detailed views of the optical modulator unit A and the optical folded part B (described later) of the optical modulation device 104 shown in FIG. 2, respectively.

The optical modulation device 104 is formed of an optical waveguide 230 (the shown entire bold dotted line) formed on a substrate 220, and performs, for example, 200G DP-QPSK modulation. The substrate 220 is, for example, a thinned Z-cut LN substrate having an electro-optic effect, which is processed to a thickness of 20 μm or less (for example, 2 μm). The optical waveguide 230 is a convex optical waveguide (for example, a rib-type optical waveguide or a ridge optical waveguide) including a strip-shaped extending protruding portion formed on the surface of the thinned substrate 220. Here, since in the LN substrate, the refractive index can locally change due to the photoelastic effect when stress is applied, the LN substrate is generally adhered to a silicon (Si) substrate, a glass substrate, an LN supporting plate, or the like in order to reinforce the mechanical strength of the entire substrate. In the present embodiment, as will be described later, the substrate 220 is adhered to the supporting plate 500.

The substrate 220 is, for example, rectangular and has two left and right sides 280a and 280b extending in the vertical direction and facing each other, and upper and lower sides 280c and 280d extending in the left and right direction and facing each other, in the drawing.

The optical waveguide 230 includes an input waveguide 232 that receives the input light (arrow pointing to the right) from the input optical fiber 114 on the upper side of the left side 280a of the substrate 220, and a branched waveguide 234 that branches the input light into two light beams having the same light amount, in the drawing. Further, the optical waveguide 230 includes a so-called nested Mach-Zehnder optical waveguides 240a and 240b, which are two modulation parts for modulating each light branched by the branched waveguide 234.

The nested Mach-Zehnder optical waveguides 240a and 240b respectively include two Mach-Zehnder optical waveguides 244a and 244b, and 244c and 244d respectively provided in two waveguide parts forming a pair of parallel waveguides. The Mach-Zehnder optical waveguides 244a and 244b have parallel waveguides 246a1 and 246a2 and parallel waveguides 246b1 and 246b2, respectively. Further, the Mach-Zehnder optical waveguides 244c and 244d have parallel waveguides 246c1 and 246c2 and parallel waveguides 246d1 and 246d2, respectively.

Hereinafter, the nested Mach-Zehnder optical waveguides 240a and 240b are collectively referred to as nested Mach-Zehnder optical waveguides 240, and the Mach-Zehnder optical waveguides 244a, 244b, 244c, and 244d are collectively referred to as Mach-Zehnder optical waveguides 244. Further, the parallel waveguides 246a1 and 246a2 are collectively referred to as parallel waveguides 246a, and the parallel waveguides 246b1 and 246b2 are collectively referred to as parallel waveguides 246b. Further, the parallel waveguides 246c1 and 246c2 are collectively referred to as parallel waveguides 246c, and the parallel waveguides 246d1 and 246d2 are collectively referred to as parallel waveguides 246d. Further, the parallel waveguides 246a, 246b, 246c, and 246d are collectively referred to as parallel waveguides 246.

As shown in FIG. 2, the nested Mach-Zehnder optical waveguide 240 includes an optical modulator unit A and an optical folded part B (each of which is a part indicated by a rectangular shape of a shown two-dot chain line). The optical folded part B is a part at which the propagation direction of light in the two nested Mach-Zehnder optical waveguides 240 is changed. Specifically, each of the Mach-Zehnder optical waveguides 244 configuring the nested Mach-Zehnder optical waveguide 240 has two parallel waveguides 246 having curved portions, and the optical folded part B is composed of curved portions of a total of eight parallel waveguides 246 that configure two nested Mach-Zehnder optical waveguides 240.

In the present embodiment, in the nested Mach-Zehnder optical waveguide 240, each of the input light branched into two beams by the branched waveguide 234 is QPSK-modulated in the optical modulator unit A after the light propagation direction is folded back by 180 degrees in the optical folded part B, and then the modulated light (output) is output from the respective output waveguides 248a and 248b to the left in the drawing. These two output light beams are then polarized and synthesized by an optical unit 116 disposed outside the substrate 220 and are combined into one light beam.

On the substrate 220, four signal electrodes 250a, 250b, 250c, and 250d for respectively causing total four Mach-Zehnder optical waveguides 244a, 244b, 244c, and 244d configuring the nested Mach-Zehnder optical waveguides 240a and 240b to perform modulation operations are provided. Hereinafter, the signal electrodes 250a, 250b, 250c, and 250d are collectively referred to as signal electrodes 250.

Each of the signal electrodes 250 includes two signal lines. That is, the signal electrode 250a includes the signal lines 252a1 and 252a2, and the signal electrode 250b includes the signal lines 252b1 and 252b2. Further, the signal electrode 250c includes the signal lines 252c1 and 252c2, and the signal electrode 250d includes the signal lines 252d1 and 252d2. Hereinafter, the signal lines 252a1 and 252a2 are collectively referred to as signal lines 252a, and the signal lines 252b1 and 252b2 are collectively referred to as signal lines 252b. Further, the signal lines 252c1 and 252c2 are collectively referred to as signal lines 252c, and the signal lines 252d1 and 252d2 are collectively referred to as signal lines 252d. Further, the signal lines 252a, 252b, 252c, and 252d are collectively referred to as signal lines 252.

A high-frequency electrical signal for causing the corresponding Mach-Zehnder optical waveguide 244 to perform a modulation operation is input to each of the signal electrodes 250. This high-frequency electrical signal is composed of two electrical signals having a phase difference of 180° from each other, that is, a differential signal. The two signal lines 252 configuring each of the signal electrodes 250 each transmit the two electrical signals configuring the differential signal input to the signal electrode 250.

In addition, in order to facilitate understanding, as an example, the differential signal is described below as a pulse signal, but the differential signal is not limited to the pulse signal. The differential signal may have any waveform in which the mutual phase information on the electrical signal affects the modulation in the two signal lines.

An intermediate layer 260 is formed on the substrate 220 between the substrate 220 and the signal line 252. The intermediate layer 260 is, for example, a buffer layer, and can be made of silicon dioxide ($SiO_2$), a resin, or the like. In the present embodiment, the intermediate layer 260 is a resin. Specifically, the intermediate layer 260 is a photoresist, which is a so-called photosensitive permanent film containing a coupling agent (cross-linking agent) and in which a cross-linking reaction proceeds and is cured by heat. Hereinafter, this photosensitive permanent film is also referred to as a permanent resist. In the present embodiment, the intermediate layer 260, which is a permanent resist, is formed on the entire surface of the substrate 220. However, this is only an example, and the intermediate layer 260 may be partially formed on the substrate 220 so as to be disposed between the substrate 220 and the signal line 252.

As shown in FIG. 3, in the optical modulator unit A, the signal lines 252a1 and 252a2 configuring the signal electrode 250a have action portions 300a and 300b (shown hatched portions) formed above the parallel waveguides 246a1 and 246a2 of the Mach-Zehnder optical waveguide 244a, and propagate differential signals having a phase difference of 180° from each other to cause the Mach-Zehnder optical waveguide 244a to perform a modulation operation. The signal lines 252b1 and 252b2 configuring the signal electrode 250b have action portions 300c and 300d formed above the parallel waveguides 246b1 and 246b2 of the Mach-Zehnder optical waveguide 244b, and propagate differential signals having a phase difference of 180° from each other to cause the Mach-Zehnder optical waveguide 244b to perform a modulation operation.

Similarly, the signal lines 252c1 and 252c2 configuring the signal electrode 250c have action portions 300e and 300f formed above the parallel waveguides 246c1 and 246c2 of the Mach-Zehnder optical waveguide 244c, and propagate differential signals having a phase difference of 180° from each other to cause the Mach-Zehnder optical waveguide 244c to perform a modulation operation. Further, the signal lines 252d1 and 252d2 configuring the signal electrode 250d have action portions 300g and 300h formed above the parallel waveguides 246d1 and 246d2 of the Mach-Zehnder optical waveguide 244d, and propagate differential signals having a phase difference of 180° from each other to cause the Mach-Zehnder optical waveguide 244d to perform a modulation operation.

Hereinafter, the action portions 300a, 300b, 300c, 300d, 300e, 300f, 300g, and 300h are collectively referred to as action portions 300.

With reference to FIG. 2, the signal lines 252a1, 252a2, 252b1, 252b2, 252c1, 252c2, 252d1, and 252d2 each extend to the right of the substrate 220, cross over the eight parallel waveguides 246 in the optical folded part B, and then, extend to the side 280b and are connected to the pads 254a, 254b, 254c, 254d, 254e, 254f, 254g, and 254h.

Hereinafter, the pads 254a, 254b, 254c, 254d, 254e, 254f, 254g, and 254h are collectively referred to as pads 254. Each of the pads 254 is connected to the relay substrate 106 of the optical modulator 100 shown in FIG. 1 by wire bonding or the like.

The left sides of the signal lines 252a1, 252a2, 252b1, 252b2, 252c1, 252c2, 252d1, and 252d2 are bent downward in the drawing and extend to the side 280d of the substrate 220, and connected to the pads 258a, 258b, 258c, 258d, 258e, 258f, 258g, and 258h. Hereinafter, the pads 258a, 258b, 258c, 258d, 258e, 258f, 258g, and 258h are collectively referred to as pads 258. The pads 258 are respectively connected to the termination resistors (not shown) configuring the terminator 112 by wire bonding or the like. There are eight termination resistors when inserted between respective eight signal lines 252 and the ground electrode (not shown in FIG. 2), and there are four termination resistors when inserted between two of the signal lines 252a, 252b, 252c, and 252d each propagating the differential signal.

In FIG. 2, according to the related art, each of the signal lines 252 together with ground electrodes (not shown) formed to sandwich the signal line 252 from positions separated by a certain distance on the surface of the substrate 220 configure a distributed constant line having a predetermined impedance. In the present embodiment, this distributed constant line is a coplanar transmission line.

Thus, the high-frequency electrical signals input from the signal pin 108 to each of the pads 254 via the relay substrate 106 become traveling waves to propagate through the respective signal lines 252, and modulate the light waves propagating through the Mach-Zehnder optical waveguide 244, in each of the action portions 300.

The optical modulation device 104 is also provided with bias electrodes 270a, 270b, and 270c for adjusting the operating point by compensating for bias point fluctuations due to so-called DC drift. The bias electrode 270a is used to compensate for bias point fluctuations of the nested Mach-Zehnder optical waveguides 240a and 240b. Further, the bias electrodes 270b and 270c are used to compensate for bias point fluctuations of the Mach-Zehnder optical waveguides 244a and 244b, and the Mach-Zehnder optical waveguides 244c and 244d, respectively.

These bias electrodes 270a, 270b, and 270c each extend to the shown upper side 280c of the substrate 220 and are connected to one of the signal pins 110 via the relay substrate 106. A corresponding signal pin 110 is connected to a bias control circuit provided outside the housing 102. Thus, the bias electrodes 270a, 270b, and 270c are driven by the bias control circuit, and the operating point is adjusted so as to compensate for fluctuations in the bias point of the corresponding each Mach-Zehnder optical waveguide. Hereinafter, the bias electrodes 270a, 270b, and 270c are collectively referred to as bias electrodes 270.

As described above, in the optical modulation device 104 of the present embodiment, in the optical folded part B, each of the Mach-Zehnder optical waveguides 244 has two parallel waveguides 246 having curved portions. Therefore, a plurality of intersections of the parallel waveguide 246 and the signal electrode 250 are present on the substrate 220. Specifically, on the substrate 220, on the right side in the drawing of the optical modulator unit A and in the optical folded part B, each of two signal lines 252 forming the signal electrode 250 intersects with two parallel waveguides 246 configuring each of four Mach-Zehnder optical waveguides 244. Here, on the surface of the substrate 220, a portion where the two signal lines 252 for propagating the differential signal and the two parallel waveguides 246 configuring one Mach-Zehnder optical waveguide 244 intersect is also referred to as an intersection region.

In FIG. 2, on the right side of the optical modulator unit A, there is an intersection region 400c1 where two signal lines 252c (that is, signal lines 252c1 and 252c2) propagating the differential signal and two parallel waveguides 246c (that is, the parallel waveguides 246c1 and 246c2) configuring the Mach-Zehnder optical waveguide 244c intersect. Further, there are intersection regions 400b1 (400b2) where the two signal lines 252c (252d) and the two parallel waveguides 246b intersect, respectively. Further, there are intersection regions 400a1 (400a2, and 400a3) where the two signal lines 252b (252c, and 252d) and the two parallel waveguides 246a intersect, respectively.

Similarly, at the optical folded part B, as shown in FIG. 4, there are intersection regions 400a4, 400a5, 400a6, and 400a7 at which two parallel waveguides 246a intersect respectively with two signal lines 252d, 252c, 252b, and 252a propagating differential signals. Further, there are intersection regions 400b3, 400b4, 400b5, 400b6 where the parallel waveguide 246b intersects the signal lines 252d, 252c, 252b, and 252a.

Further, there are intersection regions 400c2, 400b4, 400b5, and 400b6 formed by intersecting the signal lines 252d, 252c, 252b, and 252a with the parallel waveguide 246c. Further, there are intersection regions 400d1, 400d2, 400d3, 400d4 where the parallel waveguide 246d intersects the signal lines 252d, 252c, 252b, and 252a.

Hereinafter, the intersection regions 400a1, 400a2, 400a3, 400a4, 400a5, and 400a6 are collectively referred to as intersection regions 400a, and the intersection regions 400b1, 400b2, 400b3, 400b4, 400b5, and 400b6 are collectively referred to as intersection regions 400b. Further, the intersection regions 400c1, 400c2, 400c3, 400c4, and 400c5 are collectively referred to as intersection regions 400c, and the intersection regions 400d1, 400d2, 400d3, and 400d4 are collectively referred to as intersection regions 400d. Further, the intersection regions 400a, 400b, 400c, and 400d are collectively referred to as intersection regions 400.

In the optical modulation device 104, disturbance modulation due to the intersection of the parallel waveguide 246 and the signal line 252 may occur in these intersection regions 400. As described above, in the Mach-Zehnder optical waveguides 244 each including two parallel waveguides 246, the disturbance modulation not only generates noise in each optical signal propagating in these two parallel waveguides 246, but also generates noise in the phase difference between these two signal lights, which has a great influence on the modulation operation.

Since the differential signals are propagated in the two signal lines 252 in the intersection region 400, the disturbance modulation generated by one signal line 252 in the two parallel waveguides 246 can be cancelled by the disturbance modulation generated by the other signal line 252 in the two parallel waveguides 246.

However, such a canceling action is ideally effective when the differential signal propagating through the two signal lines 252 reaches each of the two parallel waveguides 246 at the same time, that is, when there is no phase difference between the differential signals reaching the parallel waveguides 246. In order to achieve such an ideal state, it is desirable that in the intersection region 400, the length (intersection clearance) between intersections of the two parallel waveguides 246 and one signal line 252 and the length (intersection clearance) between intersections of the two parallel waveguides 246 and the other signal line 252 are equal to each other.

However, when a plurality of Mach-Zehnder optical waveguides 244 having curved parallel waveguides 246 as in the present embodiment and a plurality of sets of signal lines 252 each composed of two signal lines 252 for propagating differential signals intersect, the intersection clearances of the two signal lines 252 are not always equal to each other in many cases, due to the pattern arrangement of the signal lines 252 and the parallel waveguides 246.

Figure 19:
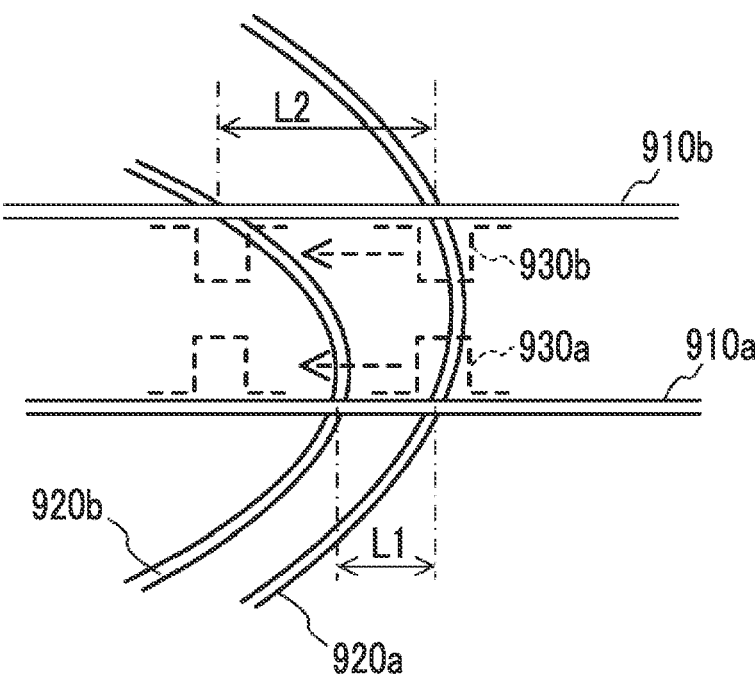
FIG. 19 is a diagram illustrating a decrease or disappearance of a canceling effect of disturbance modulation in the intersection region.

FIG. 19 is a diagram illustrating the propagation of electrical signals when the two signal lines and the two parallel waveguides intersect. In the illustrated example, the two signal lines 910a and 910b propagating the differential signal intersect each of the two parallel waveguides 920a and 920b configuring the Mach-Zehnder optical waveguide.

Hereinafter, the signal lines 910a and 910b are collectively referred to as signal lines 910, and the parallel waveguides 920a and 920b are collectively referred to as parallel waveguides 920.

In FIG. 19, the intersection clearance L2 that is the length between intersections of the two parallel waveguides 920a and 920b and one signal line 910b is longer than the intersection clearance L1 between the two parallel waveguides 920a and 920b and the other signal line 910a.

Therefore, for example, even if the non-inverted pulse 930a propagating on the signal line 910a as a differential signal pulse and the inverted pulse 930b propagating on the signal line 910b pass through one parallel waveguide 920a at the same time and the disturbance modulation in the parallel waveguide 920a is completely canceled, when the inverted pulse 930b reaches the parallel waveguide 920b, the non-inverted pulse 930a is present at a position past the parallel waveguide 920b. As a result, in the parallel waveguide 920b, the canceling effect of the disturbance modulation by these differential signal pulses is not exhibited.

Looking at this from the temporal aspect, the phenomenon of disappearance or decrease of the canceling effect of the disturbance modulation as described above can be described as follows using the propagation delay time between the differential signal pulses from passing through the parallel waveguide 920a to reaching the parallel waveguide 920b.

The propagation delay time ΔT of the inverted pulse 930b propagating in the section of the intersection clearance L2 (>L1) in the other signal line 910b with respect to the non-inverted pulse 930a propagating in the section of the intersection clearance L1 in one signal line 910a is given by the following equation, where V is the signal propagation velocity of the electrical signal in these signal lines 910.

$$\Delta T = (L2 - L1)/V \tag{1}$$

That is, even if the differential signals propagating through the two signal lines 910 are in a state in which the phases of the differential signals are exactly inverted from each other (hereinafter, referred to as an ideal inversion state) when reaching the one parallel waveguide 920a, the differential signals deviate from the ideal inversion state by the phase corresponding to the propagation delay time ΔT when reaching the other parallel waveguide 920b. As a result, in the other parallel waveguide 920b, the canceling effect of the disturbance modulation by the two signal lines 910 propagating the differential signal disappears or decreases.

In order to reduce the deviation from the ideal inversion state when reaching the other parallel waveguide 920b, it is also conceivable to provide an offset phase between the differential signals when reaching the other parallel waveguide 920a. In this case, disturbance modulation remains in both of the two parallel waveguides 920. As a result, the disturbance modulations may have an additive effect on the modulation operation of the Mach-Zehnder optical waveguide configured by the parallel waveguides 920.

In order to improve the canceling effect of the disturbance modulation by reducing the decrease or disappearance of the canceling effect of the disturbance modulation, in the present embodiment and the modification examples described later, the two signal lines 252 are configured to have a faster signal propagation velocity in the intersection region 400 than in a portion other than the intersection region 400, or one of the two signal lines 252 is configured to have a faster signal propagation velocity than the other.

Thus, in a case where the two signal lines 252 have a faster signal propagation velocity in the intersection region 400 than in the portion other than the intersection region 400, V in Equation (1) becomes larger in the intersection region 400 than in the portion other than the intersection region 400, so that the propagation delay time ΔT in the intersection region 400 is reduced. Further, in a case where one of the two signal lines 252 has a faster signal propagation velocity than the other, it is possible to reduce the propagation time difference of the differential signals propagating in the sections of the respective intersection clearances in the two signal lines, so that the propagation delay time ΔT in the intersection region 400 is reduced.

As a result, the differential signals propagating through the two signal lines 252 is less likely to deviate from the ideal inversion state when intersecting the two parallel waveguides 246, and the canceling effect of the disturbance modulation is improved as compared with the optical modulation device in the related art in which the intermediate layer is formed with the same thickness over the entire substrate.

Figure 5:
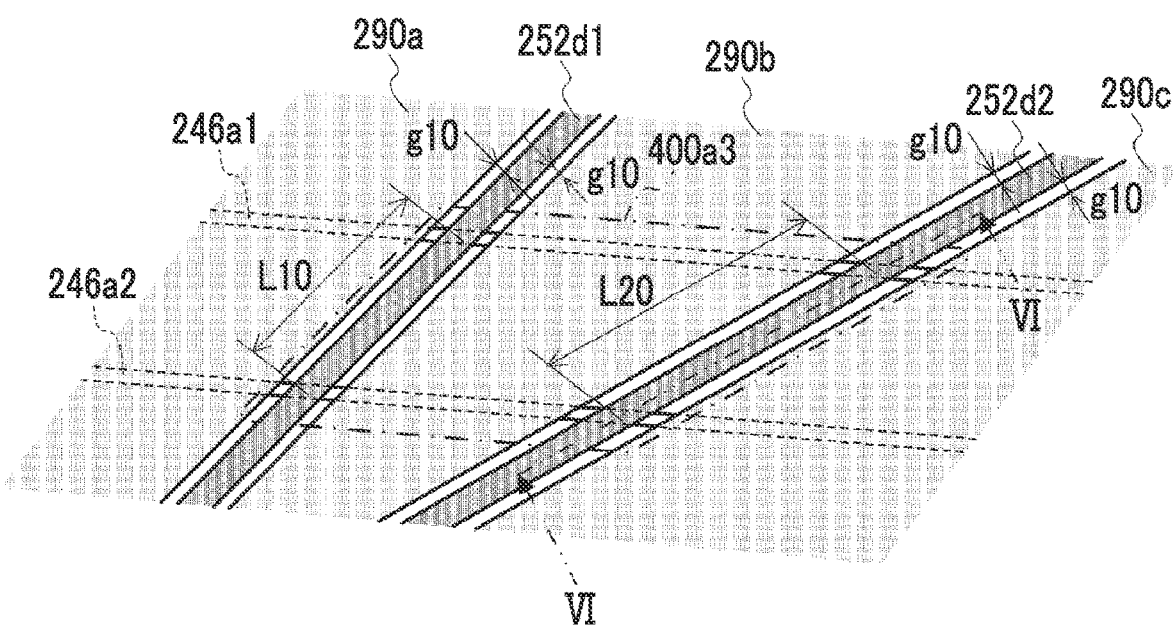
FIG. 5 is a diagram illustrating an example of a configuration of an intersection region.

As an example, the configuration of the intersection region 400a3 in FIG. 2 will be described. FIG. 5 is a partial detailed view of the intersection region 400a3 in FIG. 2. In FIG. 5, the intermediate layer 260 is not shown. Further, the ground electrodes 290a, 290b, and 290c (not shown in FIG. 2) are shown in FIG. 5. As described above, on the substrate 220, ground electrodes are formed so as to sandwich each of the signal lines 252 from a position separated by a certain clearance (separation gap), and the signal line 252 together with the ground electrodes form a distributed constant line (for example, a coplanar line) having a predetermined impedance. The ground electrodes 290a, 290b and 290c are some of such ground electrodes.

In the example of FIG. 5, the ground electrodes 290a and 290b are formed to sandwich the signal line 252d1 from positions separated by a constant separation gap g10, and the ground electrodes 290b and 290c are formed to sandwich the signal line 252d2 from positions separated by a constant separation gap g10.

Figure 6:
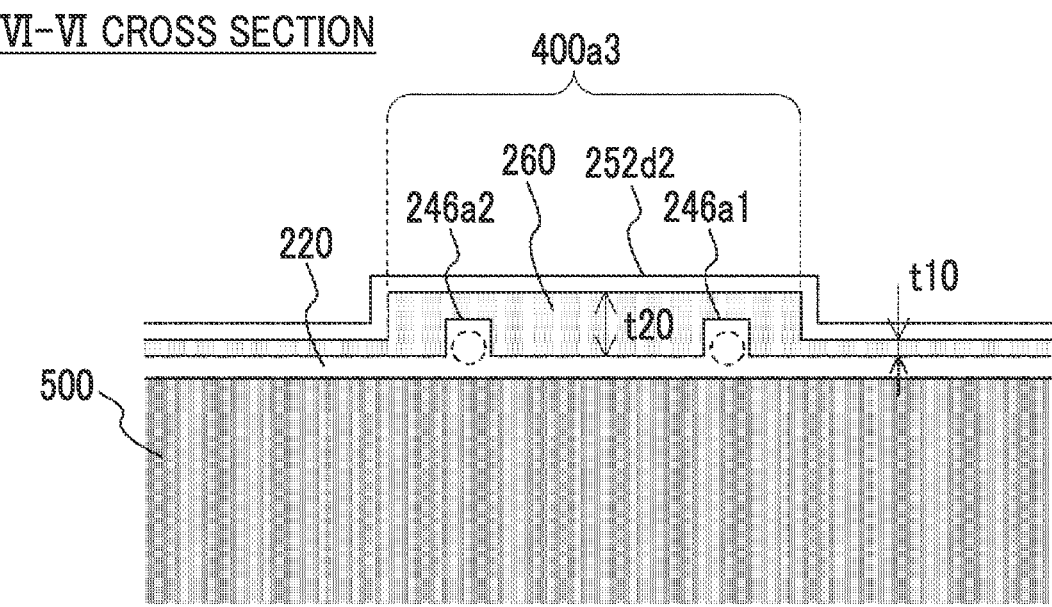
FIG. 6 is a cross-sectional view taken along line VI-VI of the intersection region shown in FIG. 5.

FIG. 6 is a cross-sectional view taken along line VI-VI in FIG. 5, showing a cross-sectional structure of the substrate 220 along the signal line 252d2. In addition, the cross-sectional structure of the substrate 220 along the signal line 252d1 is the same as the cross-sectional structure along the signal line 252d2 shown in FIG. 6. As shown in FIG. 6, the substrate 220 is fixed to the supporting plate 500.

In the intersection region 400a3, the two signal lines 252d1 and 252d2 propagating the differential signals intersect the parallel waveguides 246a1 and 246a2 configuring the Mach-Zehnder optical waveguide 244a at different intersection angles. Thus, the intersection clearance L20 that is the length between intersections of the parallel waveguides 246a1 and 246a2 and the signal line 252d2 is longer than the intersection clearance L10 that is the length between intersections of the parallel waveguides 246a1 and 246a2 and the signal line 252d1.

Further, unlike the optical modulation device in the related art in which the intermediate layer such as the buffer layer is formed on the substrate with a uniform thickness, in the present embodiment, in particular, the thickness t20 of the intermediate layer 260 between the substrate 220 and the signal line 252 in the intersection region 400a3 is larger than the thickness t10 in the portion other than the intersection region 400a3. Here, the thickness t10 may be such a thickness (for example, 1 μm or less) that substantially does not cause optical absorption loss due to the metal configuring the signal line 252 in the parallel waveguide 246, as in the optical modulation device in the related art.

The relative dielectric constant of $SiO_2$, the permanent resist, or the like used in the intermediate layer 260 such as the buffer layer is about one digit smaller than the relative dielectric constant (several tens) of a strong dielectric material such as LN used for the substrate 220. Therefore, when the intermediate layer under the signal line 252 is thickened, the electrical signals (high-frequency electrical signals in the microwave band) propagating in the signal line 252 is reduced in the effective refractive index in the signal line 252, so that the electrical signals propagate faster (for example, signal propagation velocity is faster).

In the present embodiment, with respect to the thickness of the intermediate layer between the signal lines 252d1 and 252d2 and the substrate 220, the thickness t20 in the intersection region 400a3 is larger than the thickness t10 in the portion other than the intersection region 400a3. Therefore, in the two signal lines 252d1 and 252d2, the signal propagation velocity V10 in the intersection region 400a3 becomes faster than the signal propagation velocity V0 in the portion other than the intersection region 400a3 (that is, V10>V0). Thus, in Equation (1), the signal propagation velocity V increases from V0 to V10, so that the propagation delay time ΔT decreases.

As a result, in the intersection region 400a3, the differential signal propagating through the two signal lines 252d1 and 252d2 is less likely to deviate from the ideal inversion state when intersecting with each of the two parallel waveguides 246, and the canceling effect of the disturbance modulation is improved as compared with the optical modulation device in the related art in which the intermediate layer is formed with the same thickness (for example, t10) over the entire substrate.

From the viewpoint of achieving an effective canceling effect on the disturbance modulation, it is desirable that the propagation delay time ΔT is half or less the signal pulse width Δt of the differential signal (that is, ΔT≤Δt/2). This is because when ΔT exceeds Δt/2, the phase difference between the two differential signal pulses whose phases are inverted from each other exceeds half of the pulse width, and the canceling effect of the disturbance modulation when passing through the parallel waveguides 246 is reduced to equal to or less than half.

In order to achieve an effective improvement effect on the canceling effect of the disturbance modulation, it is desirable that the thickness t20 of the intermediate layer 260 in the intersection region 400a3 is at least twice the thickness t10 in a portion other than the intersection region 400a3 (that is, t20≥2×t10). In the present embodiment, for example, t10 is 0.5 μm and t20 is 1 μm.

Further, in the present embodiment, the intermediate layer 260 is composed of a single layer, but may have a plurality of layers. For example, the intermediate layer 260 can be composed of a first intermediate layer made of $SiO_2$ formed on the substrate 220, and a second intermediate layer that is a permanent resist formed on the first intermediate layer in the intersection region 400. In this case, the first intermediate layer may be formed to have a thickness t10, and the second intermediate layer may be formed such that the overall thickness of the intermediate layer 260 including the first intermediate layer is t20.

In FIG. 2, the intersection regions 400 other than the intersection region 400a3 are drawn such that the intersection clearances between the intersections of the two parallel waveguides 246 and the two signal lines 252 that propagate the differential signal are equal to each other. However, this is an example, and depending on the pattern arrangement of the optical waveguides 230 and the signal lines 252 on the substrate 220, in the intersection regions 400 other than the intersection region 400a3, the intersection clearances in the two signal lines 252 can be different from each other, similar to the intersection region 400a3. In this case, even for any intersection region 400 having different intersection clearances of the two signal lines 252, it is possible to improve the canceling effect on the disturbance modulation in the intersection region 400, by using the configuration of the intersection region 400a3 described above and the configuration of the modification examples described later.

Next, a modification example of the configuration of the intersection region 400 will be described. In order to facilitate understanding, the following modification examples will be described as modification examples for the intersection region 400a3. However, as described above, these modification examples also can be applied to any intersection region 400 having different intersection clearances in the two signal lines 252.

1.1 First Modification Example

Figure 7:
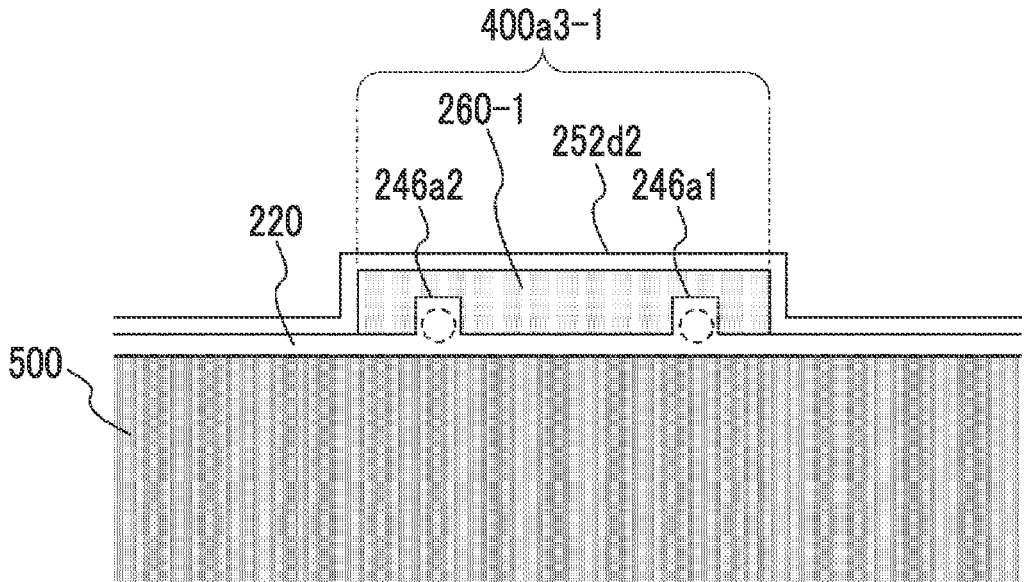
FIG. 7 is a diagram illustrating a configuration of an intersection region according to a first modification example.

FIG. 7 is a diagram showing the configuration of an intersection region 400a3-1 according to the first modification example of the intersection region 400a3 shown in FIGS. 5 and 6. The configuration of the intersection region 400a3-1 shown in FIG. 7 can be used instead of the configuration of the intersection region 400a3 shown in FIGS. 5 and 6, in the optical modulation device 104. FIG. 7 is a diagram corresponding to the VI-VI cross-sectional view of the intersection region 400a3 shown in FIG. 6, and shows the cross-sectional structure of the substrate 220 along the signal line 252d2. In addition, the cross-sectional structure of the substrate 220 along the signal line 252d1 is the same as the cross-sectional structure along the signal line 252d2 shown in FIG. 7. In FIG. 7, the same reference numerals as those in FIG. 6 are used to denote the same configuration elements illustrated in FIG. 6, a description for FIG. 6 described above will be incorporated herein.

The intersection region 400a3-1 has the same configuration as the intersection region 400a3, but is different in that it has the intermediate layer 260-1 instead of the intermediate layer 260. The intermediate layer 260-1 has the same configuration as the intermediate layer 260, but the intermediate layer 260-1 is formed only in a portion of the intersection region 400a3-1, whereas the intermediate layer 260 shown in FIG. 6 extends to the periphery of the intersection region 400a3. That is, the intermediate layer 260-1 is not provided in a portion other than the intersection region 400a3-1.

The configuration of the intersection region 400a3-1 is useful, for example, when the optical absorption loss generated in the parallel waveguides 246 due to the metal forming the signal lines 252 can be reduced to a level at which there is no problem in practical use, even if there is no buffer layer such as the intermediate layer 260 or 260-1 on the substrate.

1.2 Second Modification Example

Figure 8:
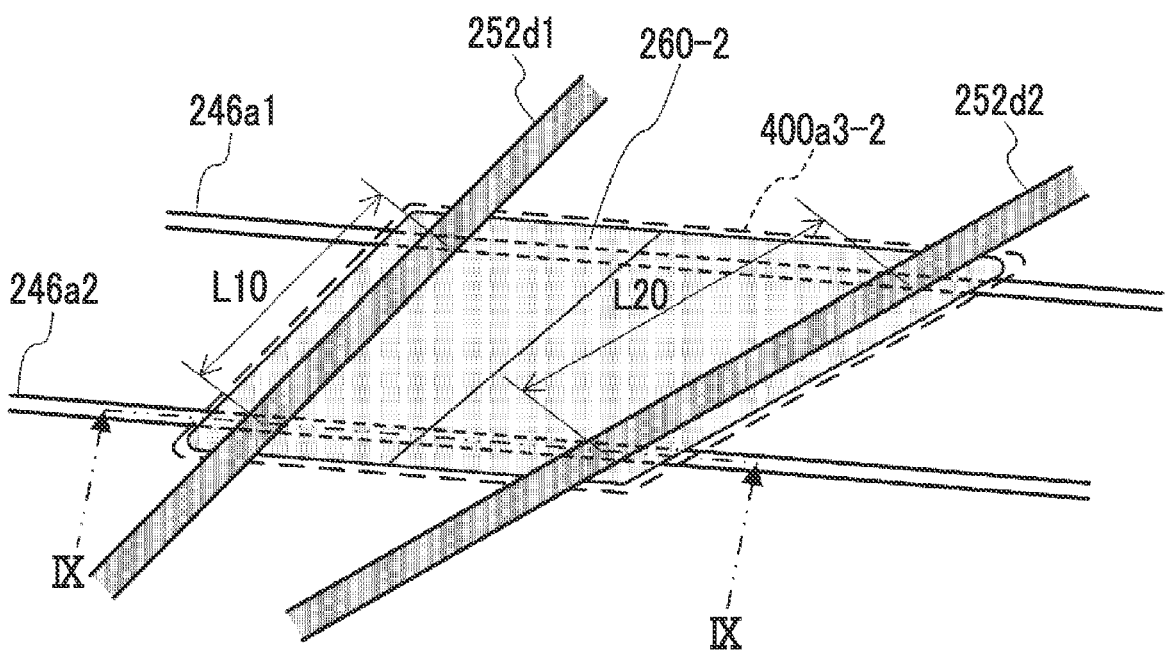
FIG. 8 is a diagram illustrating a configuration of an intersection region according to a second modification example.
Figure 9:
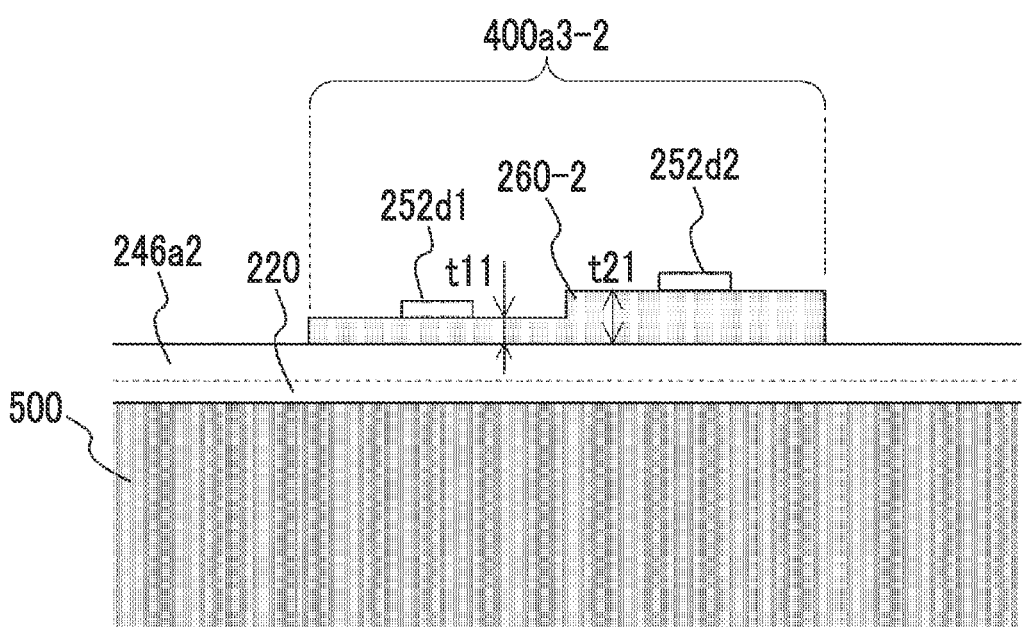
FIG. 9 is a cross-sectional view taken along line IX-IX of the intersection region shown in FIG. 8.

FIGS. 8 and 9 are diagrams showing the configuration of an intersection region 400a3-2 according to the second modification example of the intersection region 400a3 shown in FIGS. 5 and 6. The configuration of the intersection region 400a3-2 shown in FIGS. 8 and 9 can be used instead of the configuration of the intersection region 400a3 shown in FIGS. 5 and 6, in the optical modulation device 104. FIG. 8 is a plan view of the intersection region 400a3-2 corresponding to FIG. 5. Although the ground electrode is not shown in FIG. 8, it is assumed that the ground electrodes 290a, 290b, and 290c are disposed at the same positions shown in FIG. 5.

FIG. 9 is a cross-sectional view taken along line IX-IX in FIG. 8 and is a diagram showing a cross-sectional structure of the substrate 220 along the parallel waveguide 246a2. In addition, the cross-sectional structure of the substrate 220 along the parallel waveguide 246a1 is the same as the cross-sectional structure of the substrate 220 along the parallel waveguide 246a2 shown in FIG. 9. In FIGS. 8 and 9, the same reference numerals as those in FIGS. 5 and 6 are used to denote the same configuration elements illustrated in FIGS. 5 and 6, a description for FIGS. 5 and 6 described above will be incorporated herein.

In the intersection region 400a3 and the intersection region 400a3-1 which is a modification example of the intersection region 400a3 described above, both the two signal lines 252 are configured to have a signal propagation velocity faster than in the portion other than the intersection regions. On the other hand, in the intersection region 400a3-2 according to the second modification example, the two signal lines 252 are configured such that one signal line 252 having a longer intersection clearance has a faster signal propagation velocity than the other signal line having a shorter intersection clearance.

Specifically, the intersection region 400a3-2 has the same configuration as the intersection region 400a3, but is different in that it has the intermediate layer 260-2 instead of the intermediate layer 260. The intermediate layer 260-2 has the same configuration as the intermediate layer 260, but the intermediate layer 260-2 is formed only in a portion of the intersection region 400a3-1, whereas the intermediate layer 260 extends to the periphery of the intersection region 400a3.

Further, in particular, in the intermediate layer 260-2, the thickness t21 at the lower portion of the signal line 252d2 having the intersection clearance L20 longer than the intersection clearance L10 is larger than the thickness t11 at the lower portion of the signal line 252d1 having the intersection clearance L10 (that is, t21>t11). Thus, the signal line 252d2 having the longer intersection clearance L20 has a faster signal propagation velocity than the signal line 252d1 having the shorter intersection clearance L10.

Therefore, in the intersection region 400a3-2, in the signal lines 252d1 and 252d2, the propagation time difference between the electrical signals propagating through the respective intersection clearances, that is, the propagation delay time ΔT is reduced or eliminated. As a result, in the intersection region 400a3-2, the canceling effect of the disturbance modulation is improved.

1.3 Third Modification Example

Figure 10:
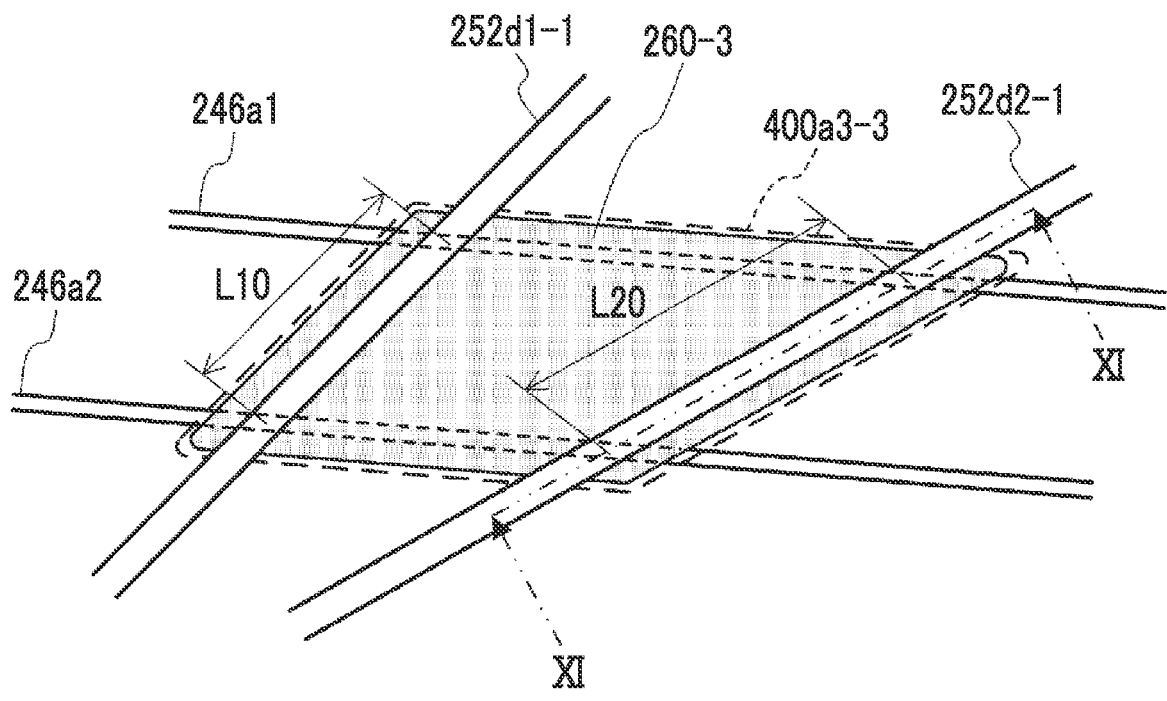
FIG. 10 is a diagram illustrating a configuration of an intersection region according to a third modification example.
Figure 11:
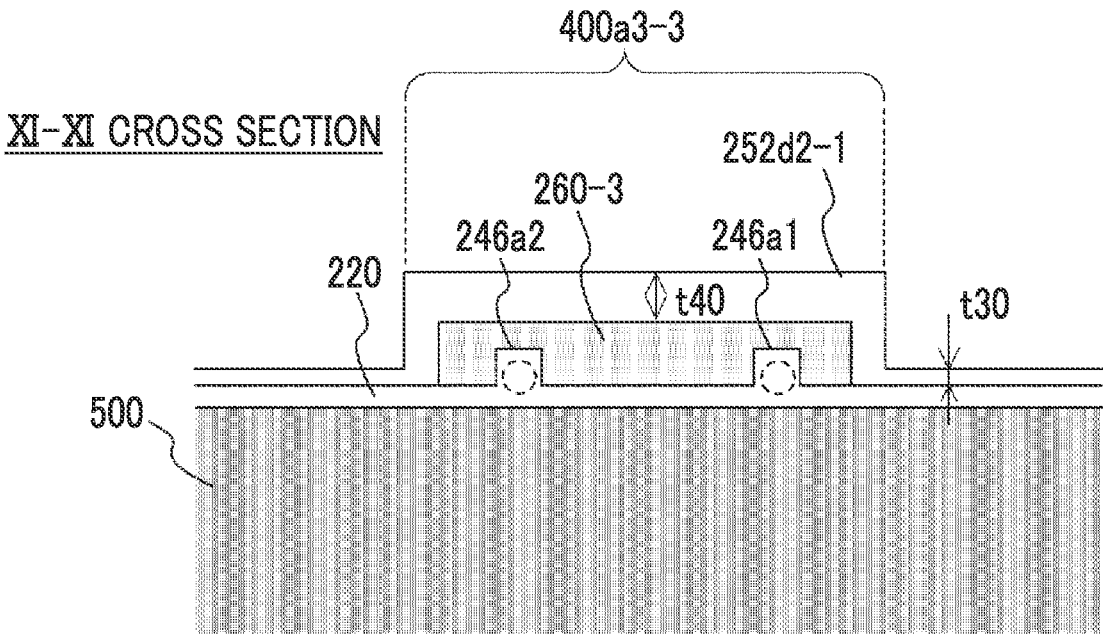
FIG. 11 is a cross-sectional view taken along line XI-XI of the intersection region shown in FIG. 10.

FIGS. 10 and 11 are diagrams showing the configuration of an intersection region 400a3-3 according to the third modification example of the intersection region 400a3 shown in FIGS. 5 and 6. The configuration of the intersection region 400a3-3 shown in FIGS. 10 and 11 can be used instead of the configuration of the intersection region 400a3 shown in FIGS. 5 and 6, in the optical modulation device 104. FIG. 10 is a plan view of the intersection region 400a3-3 corresponding to FIG. 5. Although ground electrodes are not shown in FIG. 10, similar to the ground electrodes 290a, 290b, and 290c shown in FIG. 5, it is assumed that ground electrodes sandwiching the signal lines 252$d$1-1 and 252$d$2-1 are disposed on the substrate 220 at positions spaced apart from the signal lines 252$d$1-1 and 252$d$2-1 by a predetermined distance.

FIG. 11 is a cross-sectional view taken along line XI-XI in FIG. 10 and is a diagram showing a cross-sectional structure of the substrate 220 along the signal line 252$d$2-1. In addition, the cross-sectional structure of the substrate 220 along the signal line 252$d$1-1 is also the same as in FIG. 11. In FIGS. 10 and 11, the same reference numerals as those in FIGS. 5 and 6 are used to denote the same configuration elements illustrated in FIGS. 5 and 6, a description for FIGS. 5 and 6 described above will be incorporated herein.

The intersection region 400$a$3-3 has the same configuration as the intersection region 400$a$3, but is different in that it has an intermediate layer 260-3 instead of the intermediate layer 260. The intermediate layer 260-3 has the same configuration as the intermediate layer 260, but the intermediate layer 260-3 is formed only in a portion of the intersection region 400$a$3-3, whereas the intermediate layer 260 extends to the periphery of the intersection region 400$a$3.

Further, the intersection region 400$a$3-3 has signal lines 252$d$1-1 and 252$d$2-1 instead of the signal lines 252$d$1 and 252$d$2. The signal lines 252$d$1-1 and 252$d$2-1 have the same configuration as the signal lines 252$d$1 and 252$d$2, but their thicknesses are different from those of the signal lines 252$d$1 and 252$d$2.

The signal lines 252$d$1-1 and 252$d$2-1 have the same configurations as the signal lines 252$d$1 and 252$d$2, respectively, but their thicknesses are not uniform, and the thickness t40 in the intersection region 400$a$3-3 is larger than thickness t30 in a portion other than intersection region 400$a$3-3.

As the thickness of the signal line 252 increases, the contact area with an environment (for example, a gas in the housing 102) having a relative dielectric constant smaller than the relative dielectric constant of the substrate 220 increases, and the effective refractive index with respect to the electrical signal decreases. Therefore, the signal propagation velocity in that portion becomes faster.

With respect to the signal lines 252$d$1-1 and 252$d$2-1, since the thickness t40 in the intersection region 400$a$3-3 is larger than the thickness t30 in the portion other than the intersection region 400$a$3-3, the signal propagation velocity in the intersection region 400$a$3-3 becomes faster. Thus, in combination with the fact that the intermediate layer 260-3 is provided in the intersection region 400$a$3-3, the canceling effect of the disturbance modulation in the intersection region 400$a$3-3 is further improved.

In order to achieve an effective improvement effect on the canceling effect of the disturbance modulation, with respect to the signal lines 252$d$1-1 and 252$d$2-1, it is desirable that the thickness t40 in the intersection region 400$a$3-3 is at least twice the thickness t30 in a portion other than the intersection region 400$a$3-3 (that is, t40≥2×t30). In the present modification example, for example, t30 is 5 μm and t40 is 10 μm. Such a thick signal line 252 can be formed by, for example, electrolytic plating of gold (Au).

1.4 Fourth Modification Example

Figure 12:
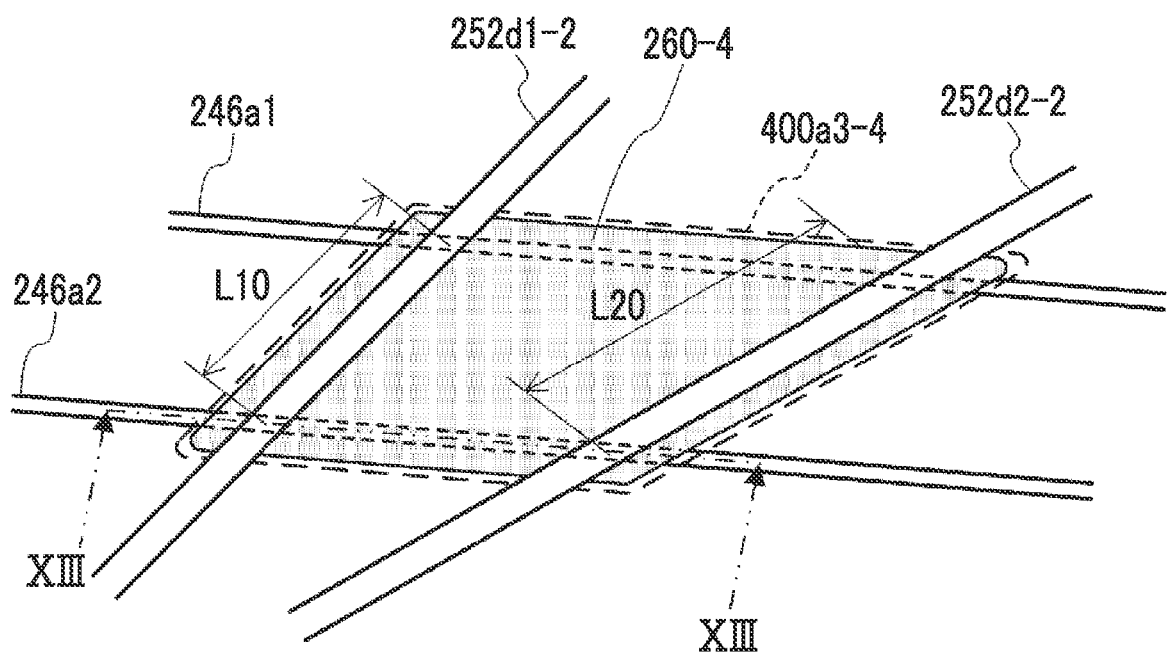
FIG. 12 is a diagram illustrating a configuration of an intersection region according to a fourth modification example.
Figure 13:
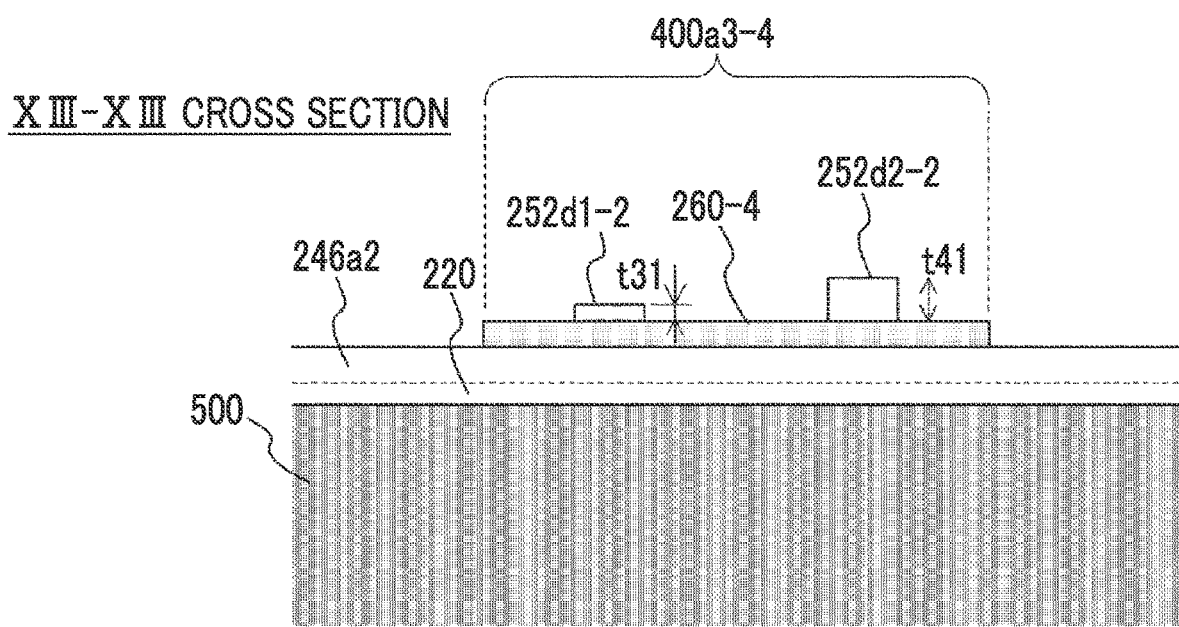
FIG. 13 is a cross-sectional view taken along line XIII-XIII of the intersection region shown in FIG. 12.

FIGS. 12 and 13 are diagrams showing the configuration of the intersection region 400$a$3-4 according to the fourth modification example of the intersection region 400$a$3 shown in FIGS. 5 and 6. The configuration of the intersection region 400$a$3-4 shown in FIGS. 12 and 13 can be used instead of the configuration of the intersection region 400$a$3 shown in FIGS. 5 and 6, in the optical modulation device 104. FIG. 12 is a plan view of the intersection region 400$a$3-4 corresponding to FIG. 5. Although ground electrodes are not shown in FIG. 12, similar to the ground electrodes 290$a$, 290$b$, and 290$c$ shown in FIG. 5, it is assumed that ground electrodes sandwiching the signal lines 252$d$1-2 and 252$d$2-2 are disposed on the substrate 220 at positions spaced apart from the signal lines 252$d$1-2 and 252$d$2-2 by a predetermined distance.

FIG. 13 is a cross-sectional view taken along line XIII-XIII in FIG. 12 and is a diagram showing a cross-sectional structure along the parallel waveguide 246$a$2. The cross-sectional structure along the parallel waveguide 246$a$1 is also the same as in FIG. 13. In FIGS. 12 and 13, the same reference numerals as those in FIGS. 5 and 6 are used to denote the same configuration elements illustrated in FIGS. 5 and 6, a description for FIGS. 5 and 6 described above will be incorporated herein.

The intersection region 400$a$3-4 has the same configuration as the intersection region 400$a$3, but is different in that it has an intermediate layer 260-4 instead of the intermediate layer 260. The intermediate layer 260-4 has the same configuration as the intermediate layer 260, but the intermediate layer 260-4 is formed only in a portion of the intersection region 400$a$3-4, whereas the intermediate layer 260 extends to the periphery of the intersection region 400$a$3.

Further, the intersection region 400$a$3-4 has signal lines 252$d$1-2 and 252$d$2-2 instead of the signal lines 252$d$1 and 252$d$2. The signal lines 252$d$1-1 and 252$d$2-1 have the same configuration as the signal lines 252$d$1 and 252$d$2, but their thicknesses are different from each other.

Specifically, in the intersection region 400$a$3-4, the thickness t41 of the signal line 252$d$2-2 having a longer intersection clearance L20 is larger than the thickness t31 of the signal line 252$d$1-2 having an intersection clearance L10 shorter than the intersection clearance L20. Thus, in the intersection region 400$a$3-4, among the two signal lines 252$d$1-2 and 252$d$2-2 propagating the differential signal, one signal line 252$d$2-2 having a longer intersection clearance has a faster signal propagation velocity than the other signal lines 252$d$1-2 having a shorter intersection clearance.

Therefore, in the intersection region 400$a$3-4, in the signal lines 252$d$1-2 and 252$d$2-2, the propagation time difference between the electrical signals propagating through the respective intersection clearances, that is, the propagation delay time ΔT is reduced or eliminated. As a result, in the intersection region 400$a$3-4, the canceling effect of the disturbance modulation is further improved.

In order to achieve an effective improvement effect on the canceling effect of the disturbance modulation, it is desirable that the thickness t41 of the signal line 252$d$2-2 is at least twice the thickness t31 of the signal line 252$d$1-2 in the intersection region 400$a$3-4 (that is, t41≥2×t31).

1.5 Fifth Modification Example

Figure 14:
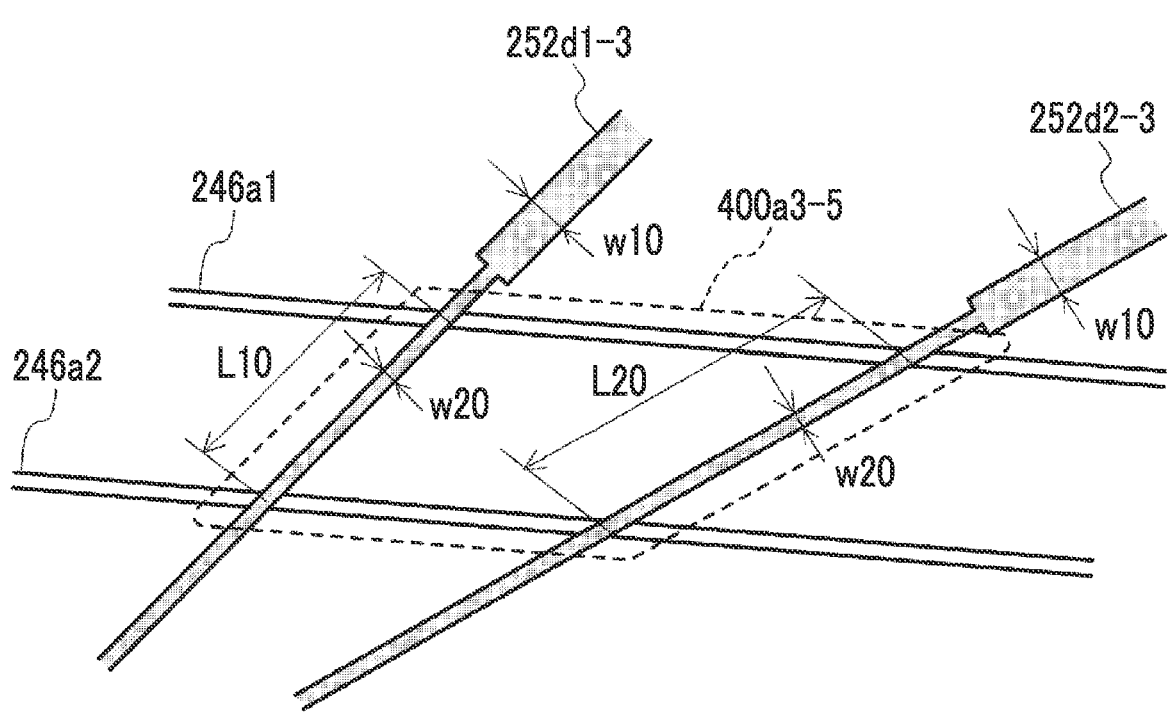
FIG. 14 is a diagram illustrating a configuration of an intersection region according to a fifth modification example.

FIG. 14 is a diagram showing the configuration of the intersection region 400$a$3-5 according to the fifth modification example of the intersection region 400$a$3 shown in FIGS. 5 and 6. The configuration of the intersection region 400$a$3-5 shown in FIG. 14 can be used instead of the configuration of the intersection region 400$a$3 shown in FIGS. 5 and 6, in the optical modulation device 104. FIG. 14 is a plan view of the intersection region 400$a$3-5 corresponding to FIG. 5. In FIG. 14, the same reference numerals as those in FIG. 5 are used to denote the same configuration elements illustrated in FIG. 5, a description for FIG. 5 described above will be incorporated herein.

Although ground electrodes are not shown in FIG. 14, similar to the ground electrodes 290*a*, 290*b*, and 290*c* shown in FIG. 5, it is assumed that ground electrodes sandwiching the signal lines 252*d*1-3 and 252*d*2-3 are disposed on the substrate 220 at positions spaced apart from the signal lines 252*d*1-3 and 252*d*2-3 by a predetermined distance. In the configuration of the intersection region 400*a*3-5 shown in FIG. 14, the intermediate layer such as the buffer layer may or may not be provided between the substrate 220 and the signal line 252.

The intersection region 400*a*3-5 has the same configuration as the intersection region 400*a*3, but has signal lines 252*d*1-3 and 252*d*2-3 instead of the signal lines 252*d*1 and 252*d*2. The signal lines 252*d*1-3 and 252*d*2-4 have the same configuration as the signal lines 252*d*1 and 252*d*2, but their widths are different from those of the signal lines 252*d*1 and 252*d*2.

Specifically, with respect to the signal lines 252*d*1-3 and 252*d*2-3 propagating the differential signal, a width w20 in the intersection region 400*a*3-5 is narrower than a width w10 in the portion upstream from the intersection region 400*a*3-5 along the propagation direction of the differential signal.

When the width of the signal line 252 is narrowed, the signal propagation velocity increases. Therefore, with respect to the signal lines 252*d*1-3 and 252*d*2-3, the signal propagation velocity in the intersection region 400*a*3-5 becomes faster than the signal propagation velocity in the portion upstream of the intersection region 400*a*3-5. Therefore, in the intersection region 400*a*3-5, the propagation delay time ΔT is reduced, so that the canceling effect of the disturbance modulation is improved.

In order to achieve an effective improvement effect on the canceling effect of the disturbance modulation, with respect to the signal lines 252*d*1-3 and 252*d*2-3, it is desirable that the width w20 in the intersection region 400*a*3-5 is half or less the width w10 in the upstream of the intersection region 400*a*3-5 (that is, w20≤½×w10). In the present modification example, for example, w10 is 20 µm and w20 is 10 µm.

Further, in the configuration shown in FIG. 14, the signal lines 252*d*1-3 and 252*d*2-3 may be configured such that the width in the portion downstream of the intersection region 400*a*3-5 along the propagation direction of the differential signal is the same as the width w10 in the portion upstream of the intersection region 400*a*3-5.

1.6 Sixth Modification Example

Figure 15:
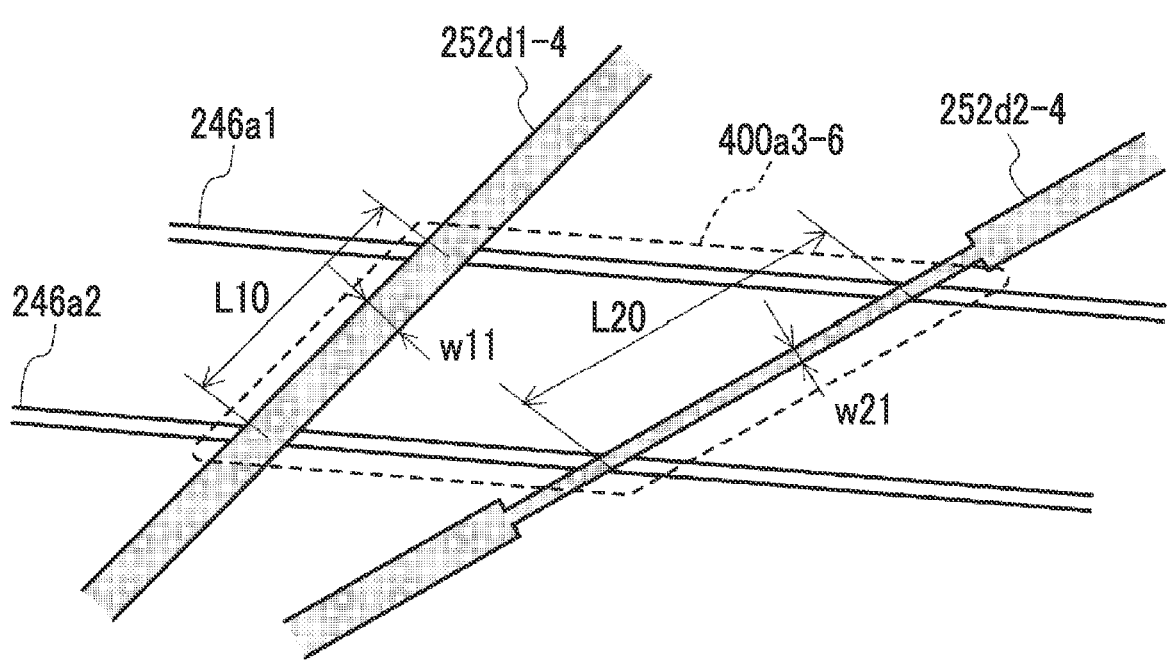
FIG. 15 is a diagram illustrating a configuration of an intersection region according to a sixth modification example.

FIG. 15 is a diagram showing the configuration of the intersection region 400*a*3-6 according to the sixth modification example of the intersection region 400*a*3 shown in FIGS. 5 and 6. The configuration of the intersection region 400*a*3-6 shown in FIG. 15 can be used instead of the configuration of the intersection region 400*a*3 shown in FIGS. 5 and 6, in the optical modulation device 104. FIG. 15 is a plan view of the intersection region 400*a*3-6 corresponding to FIG. 5. In FIG. 15, the same reference numerals as those in FIG. 5 are used to denote the same configuration elements illustrated in FIG. 5, a description for FIG. 5 described above will be incorporated herein.

Although ground electrodes are not shown in FIG. 15, similar to the ground electrodes 290*a*, 290*b*, and 290*c* shown in FIG. 5, it is assumed that ground electrodes sandwiching the signal lines 252*d*1-4 and 252*d*2-4 are disposed on the substrate 220 at positions spaced apart from the signal lines 252*d*1-4 and 252*d*2-4 by a predetermined distance. In the configuration of the intersection region 400*a*3-6 shown in FIG. 15, the intermediate layer such as the buffer layer may or may not be provided between the substrate 220 and the signal line 252.

The intersection region 400*a*3-6 has the same configuration as the intersection region 400*a*3, but has signal lines 252*d*1-4 and 252*d*2-4 instead of the signal lines 252*d*1 and 252*d*2. The signal lines 252*d*1-4 and 252*d*2-4 have the same configuration as the signal lines 252*d*1 and 252*d*2, but the relationship between the line widths are different from those of the signal lines 252*d*1 and 252*d*2.

Specifically, in the intersection region 400*a*3-6, the width w21 of one signal line 252*d*2-4 having a longer intersection clearance L20 is narrower than the width w11 of the other signal line 252*d*1-4 having a shorter intersection clearance L10.

Thus, in the intersection region 400*a*3-6, the two signal lines 252*d*1-4 and 252*d*2-4 propagating the differential signal are configured such that one signal line 252*d*2-4 having a longer intersection clearance has a faster signal propagation velocity than the other signal lines 252*d*1-4 having a shorter intersection clearance.

Therefore, in the intersection region 400*a*3-6, in the signal lines 252*d*1-4 and 252*d*2-4, the propagation time difference between the electrical signals propagating through the respective intersection clearances, that is, the propagation delay time ΔT is reduced or eliminated. As a result, in the intersection region 400*a*3-6, the canceling effect of the disturbance modulation is improved.

In order to achieve an effective improvement effect on the canceling effect of the disturbance modulation, it is desirable that the width w21 of the signal line 252*d*2-4 is half or less the width w11 of the signal line 252*d*1-4 in the intersection region 400*a*3-6 (that is, w21≤½×w11).

1.7 Seventh Modification Example

Figure 16:
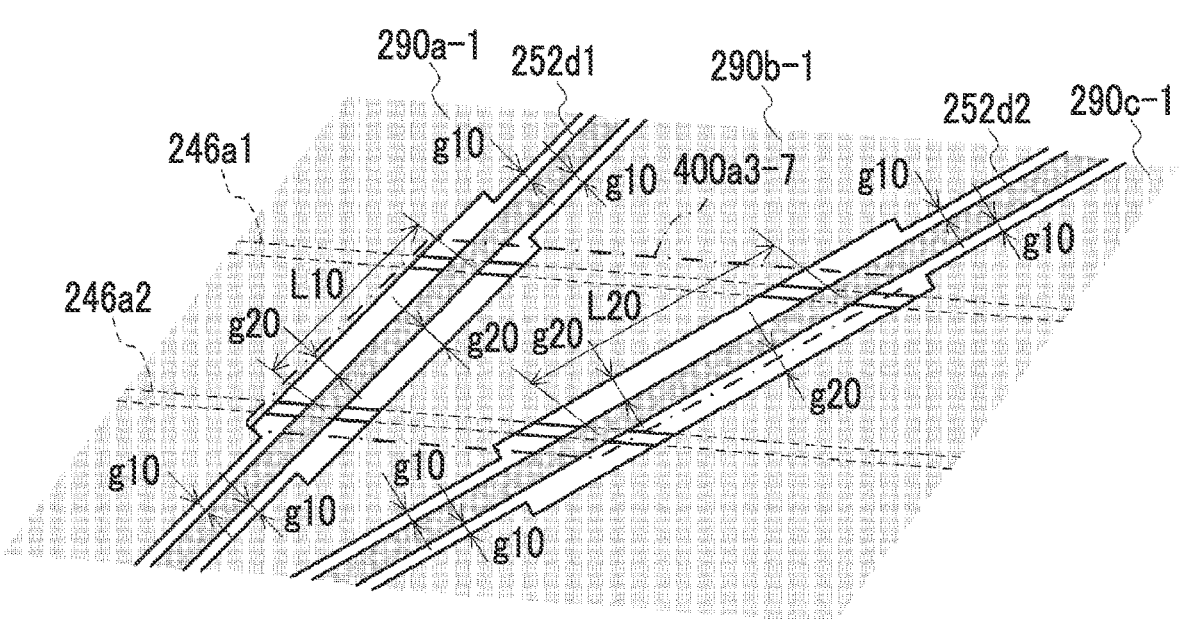
FIG. 16 is a diagram illustrating a configuration of an intersection region according to a seventh modification example.

FIG. 16 is a diagram showing the configuration of an intersection region 400*a*3-7 according to the seventh modification example of the intersection region 400*a*3 shown in FIGS. 5 and 6. The configuration of the intersection region 400*a*3-7 shown in FIG. 15 can be used instead of the configuration of the intersection region 400*a*3 shown in FIGS. 5 and 6, in the optical modulation device 104. FIG. 16 is a plan view of the intersection region 400*a*3-7 corresponding to FIG. 5. In FIG. 16, the same reference numerals as those in FIG. 5 are used to denote the same configuration elements illustrated in FIG. 5, a description for FIG. 5 described above will be incorporated herein. In the configuration of the intersection region 400*a*3-7 shown in FIG. 16, the intermediate layer such as the buffer layer may or may not be provided between the substrate 220 and the signal line 252.

The intersection region 400*a*3-7 has the same configuration as the intersection region 400*a*3, but has ground electrodes 290*a*-1, 290*b*-1, and 290*c*-1 instead of the ground electrodes 290*a*, 290*b*, and 290*c*. Hereinafter, the ground electrodes 290*a*, 290*b*, and 290*c* are collectively referred to as ground electrodes 290, and the ground electrodes 290*a*-1, 290*b*-1, and 290*c*-1 are collectively referred to as ground electrodes 290-1.

The signal lines 252*d*1 and 252*d*2 together with the ground electrode 290-1 form a distributed constant line (for example, a coplanar line) having a predetermined impedance. The ground electrode 290-1 has the same configuration as the ground electrode 290, but the separation gap from the signal line 252 is not constant as in the ground electrode 290 shown in FIG. 5, and the separation gap g20 in the intersection region 400a3-7 is wider than the separation gap g10 in a portion other than the intersection region 400a3-7 (that is, g20>g10).

When the signal line 252 has a wider clearance with the ground electrode, the signal propagation velocity in the portion increases. Therefore, with respect to the signal lines 252d1 and 252d2, the signal propagation velocity in the intersection region 400a3-7 becomes faster than the signal propagation velocity in the portion other than the intersection region 400a3-7. Therefore, in the intersection region 400a3-7, the propagation delay time ΔT is reduced, so that the canceling effect of the disturbance modulation is improved.

In addition, the separation gaps g10 and g20 between signal lines 252 and the ground electrode 290-1 need to be carefully set in consideration of the thickness of an intermediate layer such as a buffer layer that may be formed on the substrate 220, the widths of the signal lines 252, and the like in order to reduce the impedance change of the signal lines 252 due to the change in the separation gaps. In the present modification example, for example, the separation gap g10 is 5 μm and the separation gap g20 is 7 μm.

2. Second Embodiment

Figure 17:
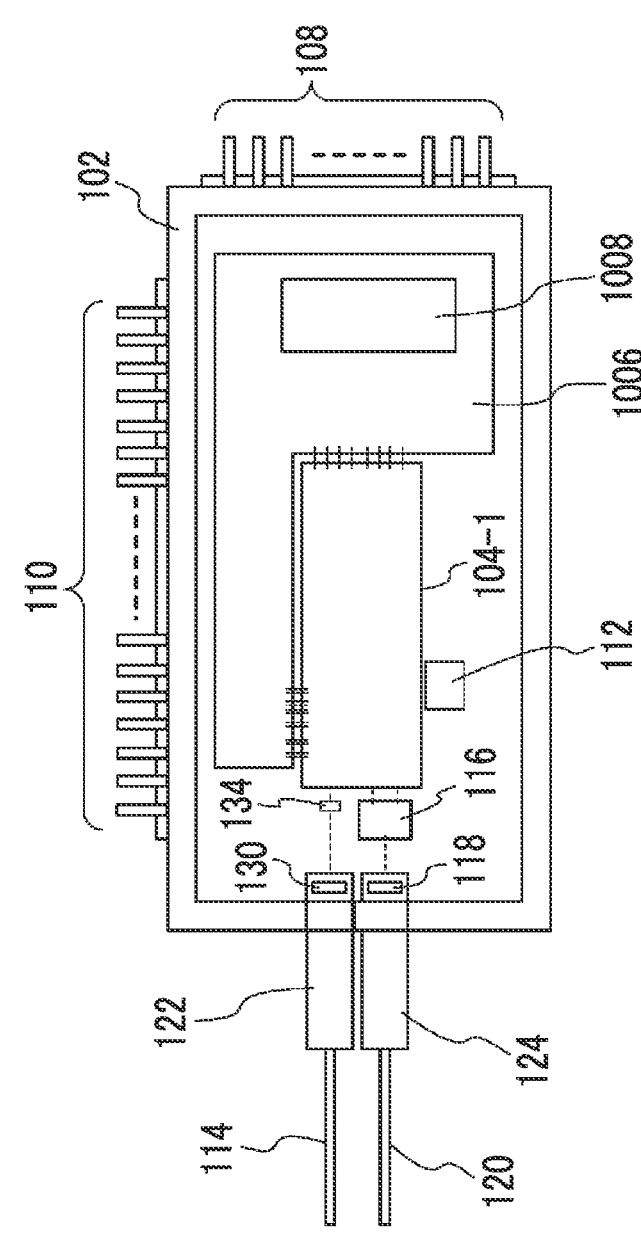
FIG. 17 is a diagram illustrating a configuration of an optical modulation module according to a second embodiment of the present invention.

Next, a second embodiment of the present invention will be described. The present embodiment is an optical modulation module 1000 using the optical modulation device 104 included in the optical modulator 100 according to the first embodiment. FIG. 17 is a diagram showing the configuration of an optical modulation module 1000 according to the present embodiment. In FIG. 17, the same configuration elements as in the optical modulator 100 according to the first embodiment shown in FIG. 1 are denoted by the same reference numerals as the reference numerals in FIG. 1, and the above description for FIG. 1 will be incorporated herein.

The optical modulation module 1000 has the same configuration as the configuration of the optical modulator 100 illustrated in FIG. 1, but differs from the optical modulator 100 in that a circuit substrate 1006 is provided instead of the relay substrate 106. The circuit substrate 1006 includes a drive circuit 1008. The drive circuit 1008 generates a differential signal, which is a high-frequency electrical signal for driving the optical modulation device 104 based on, for example, a modulation signal supplied from the outside via the signal pins 108, and outputs the generated differential signal to the optical modulation device 104.

Since the optical modulation module 1000 having the above configuration includes the optical modulation device 104 similar to the optical modulator 100 according to the first embodiment described above, disturbance modulation generated in the intersection region 400 can be effectively reduced to achieve good modulation operation, similar to the optical modulator 100.

In the present embodiment, the optical modulation module 1000 includes the optical modulation device 104 as an example, but may include the optical modulation device having the intersection region according to the modification example shown in FIGS. 7 to 16.

3. Third Embodiment

Figure 18:
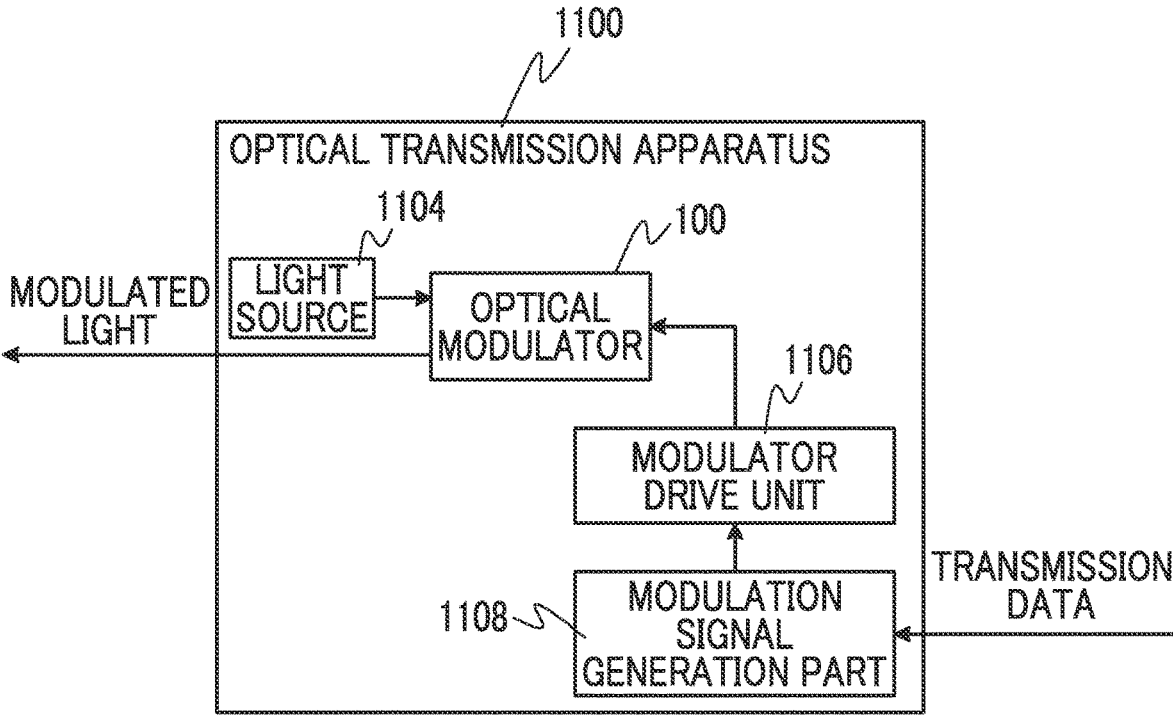
FIG. 18 is a diagram illustrating a configuration of an optical transmission apparatus according to a third embodiment of the present invention.

Next, a third embodiment of the present invention will be described. The present embodiment is an optical transmission apparatus 1100 equipped with the optical modulator 100 according to the first embodiment. FIG. 18 is a diagram showing a configuration of an optical transmission apparatus 1100 according to the present embodiment. The optical transmission apparatus 1100 includes an optical modulator 100, a light source 1104 that inputs light to the optical modulator 100, a modulator drive unit 1106, and a modulation signal generation part 1108. The optical modulation module 1000 according to the second embodiment can also be used instead of the optical modulator 100 and the modulator drive unit 1106.

The modulation signal generation part 1108 is an electronic circuit that generates an electrical signal for causing the optical modulator 100 to perform a modulation operation, which generates, based on transmission data given from the outside, a modulation signal which is a high-frequency signal for causing the optical modulator 100 to perform an optical modulation operation according to the modulation data, and outputs the modulation signal to the modulator drive unit 1106.

The modulator drive unit 1106 amplifies the modulation signal input from the modulation signal generation part 1108 and outputs the differential signal which is four sets of high-frequency electrical signals for driving four signal electrodes 250 of the optical modulation device 104 included in the optical modulator 100. As described above, instead of the optical modulator 100 and the modulator drive unit 1106, for example, the optical modulation module 1000 provided with a drive circuit 1008 including a circuit corresponding to the modulator drive unit 1106 inside the housing 102 can also be used.

The four sets of differential signals are input to the signal pins 108 of the optical modulator 100 and propagate through the four sets of signal lines 252 (that is, the signal lines 252a, 252b, 252c, and 252d) of the optical modulation device 104 to drive the optical modulation device 104. Thus, the light output from the light source 1104 is, for example, DP-QPSK modulated by the optical modulator 100 to become modulated light, and is output from the optical transmission apparatus 1100.

In particular, in the optical transmission apparatus 1100, since the optical modulator 100 or the optical modulation module 1000 according to the first embodiment described above is used, similar to the optical modulator 100 or the optical modulation module 1000, good modulation characteristics can be achieved, and good optical transmission can be performed.

The present invention is not limited to the configuration of the above embodiment and its alternative configuration, and can be implemented in various embodiments without departing from the gist thereof.

For example, in the above-described embodiment and modification examples, the resin configuring the intermediate layers 260, 260-1, 260-2, 260-3, and 260-4 is assumed to be a permanent resist as an example, but the resin configuring the intermediate layers is not limited to the permanent resist. For example, as the resin configuring these intermediate layers, a thermosetting or thermoplastic resin other than the permanent resist may be used.

Further, in the above-described embodiment and modification examples, the corner portions of the intermediate layers 260, 260-1, and 260-3 are drawn at right angles (FIGS. 6, 7, and 11), but it is desirable that the corner portions of the intermediate layers 260 or the like are curved rather than right-angled, from the viewpoint of signal transmission characteristics (particularly, radiation loss of electrical signals) of the signal line 252 formed above the intermediate layers 260, 260-1, and 260-3. Such intermediate layers having curved corner portions can be easily achieved by heat treatment or the like when a resin such as a permanent resist is used as the material.

Further, as is clear from the above-described embodiment and the modification examples, if the two signal lines 252 propagating the differential signal have a faster signal propagation velocity in the intersection region 400 than the portion other than the intersection region 400, or one of the two signal lines 252 has a faster signal propagation velocity than the other in the intersection region 400, the canceling effect of the disturbance modulation in the intersection region 400 can be improved.

Therefore, for example, the seventh modification example shown in FIG. 16 may be modified such that the signal propagation velocity of the signal line 252d2 becomes faster than the signal line 252d1 in the intersection region 400a3-7. Such a configuration can be implemented by configuring such that, for example, in the intersection region 400a3-7, the separation gap between the signal line 252d1 and the ground electrodes 290a-1 and 290b-1 is smaller than the separation gap g20 between the signal line 252d2 and the ground electrodes 290b-1 and 290c-1.

Further, the configurations of the intersection regions 400a3, 400a3-1, 400a3-2, 400a3-3, 400a3-5, 400a3-6, and 400a3-7 shown in the first embodiment and the modification examples described above can be applied to any intersection region 400 other than the intersection region 400a3, and these configurations may be mixed in one optical modulation device 104.

Further, as described above, the differential signal propagating in the signal line 252 is not limited to the pulse signal, and the differential signal may have any waveform in which the mutual phase information on the electrical signal affects the modulation in the two signal lines. That is, the optical modulation device 104 may be a modulation device having any configuration and having a signal electrode capable of operating.

Further, in the above-described embodiments, as an example of the optical waveguide device, the optical modulation device 104 formed of the substrate 220 of LN (LiNbO3) is shown, but without being limited to this, the optical waveguide device can be a device having any function (in addition to optical modulation, optical switch, optical directional coupler, or the like), which is formed of a substrate of any material (in addition to LN, InP, Si, or the like). Such devices may be, for example, so-called silicon photonics waveguide devices.

4. Configuration Supported by Above Embodiments

The above embodiments and modification examples support the following configurations.

(Configuration 1) An optical waveguide device including: an optical waveguide composed of a protruding portion extending on a substrate; and a signal electrode that is formed on the substrate and controls light waves propagating through the optical waveguide, in which the optical waveguide includes a Mach-Zehnder optical waveguide including two parallel waveguides having curved portions, the signal electrode includes two signal lines for transmitting a differential signal, each intersecting the two parallel waveguides at the curved portions, and in an intersection region, which is a region on the substrate where the two signal lines and the two parallel waveguides intersect each other, at least one of the two signal lines has a signal propagation velocity faster than in a portion other than the intersection region or one of the two signal lines has a signal propagation velocity faster than an other signal line.

According to the optical waveguide device of Configuration 1, in an optical waveguide device having a plurality of intersection regions between a convex optical waveguide and an electrode for propagating an electrical signal, the occurrence of disturbance modulation in the intersection regions is effectively reduced, thereby achieving good operating characteristics.

(Configuration 2) The optical waveguide device described in Configuration 1, in which the substrate is provided with an intermediate layer between the substrate and the signal lines, and a thickness of the intermediate layer in the intersection region is larger than a thickness in the portion other than the intersection region.

According to the optical waveguide device of Configuration 2, the signal propagation velocity in the signal line is adjusted according to the thickness of the intermediate layer, and the occurrence of disturbance modulation in the intersection region can be effectively reduced.

(Configuration 3) The optical waveguide device described in Configuration 1, in which an intermediate layer is provided between the substrate and the signal lines in the intersection region, and the intermediate layer is not provided in the portion other than the intersection region, on the substrate.

According to the optical waveguide device of Configuration 3, even when an intermediate layer such as a buffer layer is not provided on the substrate, the occurrence of disturbance modulation in the intersection region can be effectively reduced.

(Configuration 4) The optical waveguide device described in Configuration 2, in which the thickness of the intermediate layer in the intersection region is at least twice as large as the thickness in the portion other than the intersection region.

According to the optical waveguide device of Configuration 4, the occurrence of disturbance modulation in the intersection region can be further effectively reduced.

(Configuration 5) The optical waveguide device described in any one of Configurations 2 to 4, in which in the intersection region, one of the two signal lines has a longer intersection clearance, which is a clearance between positions intersecting the two parallel waveguides, than an other signal line, and the intermediate layer in the intersection region has a thickness in a lower portion of the one of the two signal lines larger than a thickness in a lower portion of the other.

According to the optical waveguide device of Configuration 5, the signal propagation velocity of the signal line having the longer intersection clearance is increased with respect to the signal line having the shorter intersection clearance, and the occurrence of disturbance modulation in the intersection region can be effectively reduced.

(Configuration 6) The optical waveguide device described in Configuration 1, in which the two signal lines have a thickness in the intersection region larger than a thickness in the portion other than the intersection region.

According to the optical waveguide device of Configuration 6, the signal propagation velocity is adjusted according to the thickness of the signal line, and the occurrence of disturbance modulation in the intersection region can be effectively reduced.

(Configuration 7) The optical waveguide device described in Configuration 6, in which the two signal lines have the thickness in the intersection region that is at least twice as large as the thickness in the portion other than the intersection region.

According to the optical waveguide device of Configuration 7, the occurrence of disturbance modulation in the intersection region can be further effectively reduced.

(Configuration 8) The optical waveguide device described in Configuration 6 or 7, in which in the intersection region, one of the two signal lines has a longer intersection clearance, which is a clearance between positions intersecting the two parallel waveguides, than an other signal line, and in the intersection region, a thickness of one of the two signal lines is larger than a thickness of an other signal line of the two signal lines.

According to the optical waveguide device of Configuration 8, the signal propagation velocity of the signal line having the longer intersection clearance is increased with respect to the signal line having the shorter intersection clearance, and the occurrence of disturbance modulation in the intersection region can be effectively reduced.

(Configuration 9) The optical waveguide device described in Configuration 1, in which the two signal lines have a width in the intersection region narrower than a width in a portion upstream of the intersection region along a propagation direction of the differential signal.

According to the optical waveguide device of Configuration 9, the signal propagation velocity in the signal line is adjusted according to the line width of the signal line, and the occurrence of disturbance modulation in the intersection region can be effectively reduced.

(Configuration 10) The optical waveguide device described in Configuration 1, in which in the intersection region, one of the two signal lines has a longer intersection clearance, which is a clearance between positions intersecting the two parallel waveguides, than an other signal line, and in the intersection region, a width of one of the two signal lines is narrower than a width of an other signal line of the two signal lines.

According to the optical waveguide device of Configuration 10, the signal propagation velocity of the signal line having the longer intersection clearance is increased with respect to the signal line having the shorter intersection clearance, and the occurrence of disturbance modulation in the intersection region can be effectively reduced.

(Configuration 11) The optical waveguide device described in Configuration 1, in which a ground electrode is provided on the substrate, and a clearance between the two signal electrodes and the ground electrode in the intersection region is wider than a clearance in the portion other than the intersection region.

According to the optical waveguide device of Configuration 11, the signal propagation velocity in the signal line is adjusted according to the separation gap between the signal line and the ground electrode, and the occurrence of disturbance modulation in the intersection region can be effectively reduced.

(Configuration 12) An optical modulator including: the optical waveguide device described in any one of Configurations 1 to 11, which is an optical modulation device that modulates light; a housing that houses the optical waveguide device; an optical fiber that inputs light to the optical waveguide device; and an optical fiber that guides light output by the optical waveguide device to outside the housing.

According to the optical modulator of Configuration 12, it is possible to achieve good optical modulation characteristics by reducing the occurrence of disturbance modulation.

(Configuration 13) An optical modulation module including: the optical waveguide device described in any one of Configurations 1 to 11, which is an optical modulation device that modulates light; and a drive circuit that drives the optical waveguide device.

According to the optical modulation module of Configuration 13, it is possible to achieve good optical modulation characteristics by reducing the occurrence of disturbance modulation.

Configuration 14

An optical transmission apparatus including: the optical modulator described in Configuration 12 or the optical modulation module described in Configuration 13, and an electronic circuit that generates an electrical signal for causing the optical waveguide device to perform a modulation operation.

According to the optical transmission apparatus of Configuration 14, good optical transmission characteristics can be achieved.

REFERENCE SIGNS LIST

100 Optical modulator
102 Housing
104 Optical modulation device
106 Relay substrate
108, 110 Signal pin
112 Terminator
114 Input optical fiber
116 Optical unit
118, 130, 134 Lens
120 Output optical fiber
122, 124 Support
220 Substrate
230 Optical waveguide
232 Input waveguide
234 Branched waveguide
240, 240$a$, 240$b$ Nested Mach-Zehnder optical waveguide
244, 244$a$, 244$b$, 244$c$, 244$d$ Mach-Zehnder optical waveguide
246, 246$a$, 246$a$1, 246$a$2, 246$b$, 246$b$1, 246$b$2, 246$c$, 246$c$1, 246$c$2, 246$d$, 246$d$1, 246$d$2, 920$a$, 920$b$ Parallel waveguide
248$a$, 248$b$ Output waveguide
250$a$, 250$b$, 250$c$, 250$d$ Signal electrode
252, 252$a$, 252$a$1, 252$a$2, 252$b$, 252$b$1, 252$b$2, 252$c$, 252$c$1, 252$c$2, 252$d$, 252$d$1, 252$d$1-1, 252$d$1-2, 252$d$1-3, 252$d$1-4, 252$d$2, 252$d$2-1, 252$d$2-2 252$d$2-3, 252$d$2-4, 910$a$, 910$b$ Signal line
254$a$, 254$b$, 254$c$, 254$d$, 254$e$, 254$f$, 254$g$, 254$h$, 258$a$, 258$b$, 258$c$, 258$d$, 258$e$, 258$f$, 258$g$, 258$h$ Pad
270$a$, 270$b$, 270$c$ Bias electrode
290, 290$a$, 290$b$, 290$c$, 290-1, 290$a$-1, 290$b$-1, 290$c$-1 Ground electrode
280$a$, 280$b$, 280$c$, 280$d$ Side
300, 300$a$, 300$b$, 300$c$, 300$d$ Action portion
400, 400$a$, 400$a$1, 400$a$2, 400$a$3, 400$a$3-1, 400$a$3-2, 400$a$3-3, 400$a$3-4, 400$a$3-5, 400$a$3-6, 400$a$3-7, 400$a$4, 400$a$5, 400$a$6, 400$a$7, 400$b$, 400$b$1, 400$b$2, 400$b$3, 400$b$4, 400$b$5, 400$b$6, 400$c$, 400$c$1, 400$c$2, 400$c$3, 400$c$4, 400$c$5, 400$d$,
400$d$1, 400$d$2, 400$d$3, 400$d$**4 Intersection region
500 Supporting plate
260, 260-1, 260-2, 260-3, 260-4 Intermediate layer
1000 Optical modulation module
1006 Circuit substrate
1008 Drive circuit

1100 Optical transmission apparatus
1104 Light source
1106 Modulator drive unit
1108 Modulation signal generation part

The invention claimed is:

1. An optical waveguide device comprising:

an optical waveguide composed of a protruding portion extending on a substrate; and a signal electrode that is formed on the substrate and controls light waves propagating through the optical waveguide, wherein the optical waveguide includes a Mach-Zehnder optical waveguide including two parallel waveguides having curved portions, the signal electrode includes two signal lines for transmitting a differential signal, each intersecting the two parallel waveguides at the curved portions, and in an intersection region, which is a region on the substrate where the two signal lines and the two parallel waveguides intersect each other, the two signal lines have different intersection clearances, which are clearances between portions intersecting the two parallel waveguides, and in the intersection region, at least one of the two signal lines has a signal propagation velocity faster than in a portion other than the intersection region or one of the two signal lines having a longer intersection clearance has a signal propagation velocity faster than an other signal line having a shorter intersection clearance.

2. The optical waveguide device according to claim 1, wherein the substrate is provided with an intermediate layer between the substrate and the signal lines, and a thickness of the intermediate layer in the intersection region is larger than a thickness in the portion other than the intersection region.

3. The optical waveguide device according to claim 2, wherein the thickness of the intermediate layer in the intersection region is at least twice as large as the thickness in the portion other than the intersection region.

4. The optical waveguide device according to claim 2, wherein the intermediate layer in the intersection region has a thickness in a lower portion of the one of the two signal lines larger than a thickness in a lower portion of the other signal line.

5. The optical waveguide device according to claim 1, wherein an intermediate layer is provided between the substrate and the signal lines in the intersection region, and the intermediate layer is not provided in the portion other than the intersection region, on the substrate.

6. The optical waveguide device according to claim 1, wherein the two signal lines have a thickness in the intersection region larger than a thickness in the portion other than the intersection region.

7. The optical waveguide device according to claim 6, wherein the two signal lines have the thickness in the intersection region that is at least twice as large as the thickness in the portion other than the intersection region.

8. The optical waveguide device according to claim 6, wherein in the intersection region, a thickness of one of the two signal lines is larger than a thickness of the other signal line.

9. The optical waveguide device according to claim 1, wherein the two signal lines have a width in the intersection region narrower than a width in a portion upstream of the intersection region along a propagation direction of the differential signal.

10. The optical waveguide device according to claim 1, wherein in the intersection region, a width of one of the two signal lines is narrower than a width of the other signal line.

11. The optical waveguide device according to claim 1, wherein a ground electrode is provided on the substrate, and a clearance between the two signal electrodes and the ground electrode in the intersection region is wider than a clearance in the portion other than the intersection region.

12. An optical modulator comprising:

the optical waveguide device according to claim 1, which is an optical modulation device that modulates light;

a housing that houses the optical waveguide device;

an optical fiber that inputs light to the optical waveguide device; and an optical fiber that guides light output by the optical waveguide device to outside the housing.

13. An optical transmission apparatus comprising:

the optical modulator according to claim 12; and an electronic circuit that generates an electrical signal for causing the optical waveguide device to perform a modulation operation.

14. An optical modulation module comprising:

the optical waveguide device according to claim 1, which is an optical modulation device that modulates light; and a drive circuit that drives the optical waveguide device.

15. An optical transmission apparatus comprising:

the optical modulation module according to claim 14; and an electronic circuit that generates an electrical signal for causing the optical waveguide device to perform a modulation operation.

* * * * *